United States Patent [19]
Sato et al.

[11] Patent Number: 5,645,898
[45] Date of Patent: Jul. 8, 1997

[54] METHOD FOR MANUFACTURING A MAGNETIC RECORDING MEMBER

[75] Inventors: Kenji Sato; Iwao Okamoto; Chiaki Okuyama, all of Kanagawa, Japan

[73] Assignee: Fujitsu Limited, Kawasaki, Japan

[21] Appl. No.: 589,217

[22] Filed: Jan. 22, 1996

[30] Foreign Application Priority Data

Jan. 23, 1995 [JP] Japan ................................. 7-008252
Nov. 10, 1995 [JP] Japan ................................. 7-292359

[51] Int. Cl.$^6$ ...................................... H05H 1/00
[52] U.S. Cl. ............... 427/539; 156/643.1; 156/646.1; 427/128; 427/130; 427/131; 427/132; 427/264; 427/271; 427/343; 427/344; 427/377; 427/388.1; 427/404; 427/419.7; 427/535; 427/555; 427/558
[58] Field of Search ...................... 427/128–132, 427/264, 271, 343, 344, 377, 388.1, 404, 419.2, 419.7, 535, 539, 555, 558; 156/643.1, 646.1

[56] References Cited

FOREIGN PATENT DOCUMENTS

| 60-253018 | 12/1985 | Japan . |
| 60-261017 | 12/1985 | Japan . |
| 4255908 | 9/1992 | Japan . |
| 5282666 | 10/1993 | Japan . |

Primary Examiner—Bernard Pianalto
Attorney, Agent, or Firm—Greer, Burns & Crain, Ltd.

[57] ABSTRACT

The present invention may provide a method for manufacturing a magnetic recording medium with high reliability by rendering simply a surface of a magnetic recording medium rough. A recording film of a magnetic material is formed on a nonmagnetic substrate, then a multilayered or composite protection film including first and second materials is formed on the recording film, and then selectively etching one of said first and second materials to transform a surface of the recording film into a rough surface.

25 Claims, 11 Drawing Sheets

METHOD FOR MANUFACTURING A MAGNETIC RECORDING MEMBER

BACKGROUND OF THE INVENTION

1. Field of the Invention

The present invention relates to a nonmagnetic substrate, a magnetic recording medium a magnetic recording drive, a method for manufacturing the magnetic recording medium and a method for transforming a surface of a layer into a rough surface.

2. Description of the Prior Art

In recent years, in the magnetic disk drive which is used as an external storage unit of the computer, a surface of a recording medium must be planarized to attain high density recording. In the magnetic disk drive employing a contact start-stop (CSS) scheme, there are however some cases wherein, since sticking is caused between a floating surface of the magnetic disk and a surface of the magnetic recording medium at the time when the magnetic disk drive is stopped, travel of the magnetic head is interfered with such sticking. For this reason, processing wherein the surface of the magnetic recording medium is processed to be rendered rough in such a degree that the sticking will not be caused, i.e., texture processing has been made as an endeavor to lower friction between the magnetic head and the magnetic recording medium In this case, it is very important to adjust height of projections in the texture processing since the spacing loss would be increased in proportion if the height of the projections are formed too higher.

For instance, as shown in FIG. 1, in the magnetic disk drive wherein the recording film 104 is formed on an aluminum substrate 101 on which an NiP film 102 is coated, an uneven shape is formed on the surface of the magnetic disk by forming mechanically textures on the surface of the NiP film 102. In FIG. 1, a reference 103 denotes a base film, and a reference 10 denotes a protection film.

In case the hard substrate such as the glass substrate on which mechanical textures are difficult to be formed must be employed, there has been disclosed the technique discussed in Patent Application Publication (KOKAI) 4-255908, for example. As shown in FIG. 2, in this technique, a film 112 of a low surface energy metal such as Ti is formed on a disk substrate 111, and a low melting point metal film 113 such as Al film is then formed thereon. If the low melting point metal film 113 is processed by heat treatment to condense Al particles, so that uniformly distributed projections are formed on the surface of the film 112 to thus form the rough surface. A reference 114 denotes a base layer; 115, recording layer; and 116, protection film. A technique has been disclosed in Patent Application Publication (KOKAI) 60-261017 wherein, by distributing microcrystals of Cr oxide on the surface of the substrate (magnetic tape), projections are formed on the surface of the recording layer which is formed on the substrate.

Alternatively, as shown in Patent Application Publication (KOKAI) 5-282666, there has been proposed a technique wherein, by mixing the fine particles into the protection layer formed on the surface of the recording layer, the surface of the recording substrate may be rendered rough while keeping the smooth surface of the recording layer.

In the conventional method for manufacturing the magnetic disk employing the mechanical texture processing shown in FIG. 1, however, it is hard to control a shape of the surface of the magnetic disk, and therefore sharp projections often exist. Such sharp projections are broken by the contact to the magnetic head, etc. to become dusts which sometimes cause the magnetic head crush. In the techniques disclosed in Patent Application Publication (KOKAI) 4-255908 or Patent Application Publication (KOKAI) 60-261017, the number of steps is increased in manufacturing process, and the manufacturing steps become thus complicated.

Furthermore, in the above three techniques, the base layer beneath the recording layer is formed to be rough, so that the surface of the recording layer per se would be rendered rough. Such coarse surface of the recording layer causes in general the medium noise. In contrast to this, the conventional technique recited in the above Patent Application Publication (KOKAI) 5-282666, the rough surface of the recording medium can be obtained by mixing fine particles into the protection layer formed on the surface of the recording layer etc., with the smooth surface of the recording layer being maintained. For this reason, the rough surface of the recording layer can be avoided, but there is caused a drawback that the device would be contaminated in the course of mixing fine particles such as $SiO_2$ into the protection layer. In other words, although these fine particles are mixed into the protection layer by spraying the fine particles such as $SiO_2$ in the film forming gas when the protection layer is sputtered, the sputtering apparatus is contaminated by the fine particles such as $SiO_2$ to thus let a maintenance of the sputtering apparatus troublesome.

SUMMARY OF THE INVENTION

The present invention has been made in view of the above drawbacks in the prior art, and it is an object of the present invention to provide a texture processing method as an easy manufacturing method capable of rendering a surface of a layer appropriately rough.

It is another object of the present invention to provide a nonmagnetic substrate, a magnetic recording medium and a magnetic recording drive, all being subject to the texture processing.

According to the manufacturing method of the present invention, a recording film of a magnetic material is formed on a nonmagnetic substrate, then a protection film of plural nonmagnetic materials is formed on the recording film. The protection film is formed of either a multilayered film or a composite film consisting of, for example, one particles of carbon and the other particles of one selected from a group of Al, Cr, Zr, Hf, Ti, Si and Mg or their oxide, nitride and carbide. The protection film has a smooth surface after being formed, but either particles existing on the surface of the protection film may then be selectively removed by treating the protection film by selective etching. As a result, since only either particles may be removed from the surface of the protection film to thus render the surface of the protection film rough. Consequently, a kinematic friction coefficient between the magnetic recording medium and the magnetic head can be reduced to thus avoid sticking between them.

In this manner, in the present invention, first the protection film is provided on the recording film, and then the rough surface of the protection film may be formed by treating the protection film by selective etching. The recording film thus maintains smooth surface so that there is no possibility that the recording characteristic will be degraded. If mainly carbon particles exist on the surface of the protection film, the selective etching may be conducted as heating process, UV irradiation process or plasma process in an oxygen gas atmosphere. In addition, if the surface of the protection film comprises mainly a material such as $SiO_2$ particles other than carbon particles, the selective etching may be conducted as plasma etching process in a gas containing fluorine or chlorine.

Furthermore, if the protection film is formed by a nonmagnetic amorphous film or a microcrystalline film consisting of either at least one material of $Al_xSn_{100-x}$ ($1 \leq x \leq 10\%$) and $Ag_yBi_{100-y}$ ($1 \leq y \leq 35\%$), or at least one material of $Al_aGe_{100-a}$ ($10 \leq a \leq 40\%$), $Al_bLa_{100-b}$ ($82 \leq b \leq 92\%$), $Al_cSi_{100-c}$ ($2 \leq c \leq 15\%$), $Al_dTe_{100-d}$ ($78 \leq d \leq 99\%$), $Au_eGe_{100-e}$ ($20 \leq e \leq 44\%$), $Au_fSb_{100-f}$ ($28 \leq f \leq 67\%$), $Au_gSi_{100-g}$ ($67 \leq g \leq 85\%$), $Pt_hSb_{100-h}$ ($66 \leq h \leq 68\%$), $Ag_iCe_{100-i}$ ($20 \leq i \leq 25\%$), $Ag_jGe_{100-j}$ ($72 \leq j \leq 76\%$), $Ag_kLa_{100-k}$ ($23 \leq k \leq 32\%$), $Ag_mSb_{100-m}$ ($11 \leq m \leq 78\%$) (where % is indicated by atomic %), then the protection film may be treated by heating and annealing in the air or inert gas atmosphere to thus promote crystallization of the non-magnetic amorphous material or the microcrystalline material. As a result, the surface of the protection film may be rendered effectively rough, and therefore the magnetic recording medium having a small kinematic friction coefficient can be obtained.

Moreover, in the present invention, reactive material regions are partially distributed at a predetermined density on the entirety of the surface region of a nonreactive material of a layer, then the surface region of the layer is exposed to a reaction gas to cause the reactive material to react to the reaction gas, thus raising partially the surface of the layer.

For instance, to form the above surface of the layer, a first film of a reactive material first is formed on a substrate, then a second film of a nonreactive material is formed on the first film to have a film thickness which does not to form continuous film in a plane direction. In addition, the second film of the nonreactive material into which a second reactive material is added is formed on the first film of a first reactive material, then the second reactive material is caused to react to the reaction gas by exposing the surface of the second reactive material to the reaction gas, so that the first film is exposed by removing partially the second reactive material from the second film.

The reactive material of the base layer is caused to react to the reaction gas by exposing the surface of the layer formed as above to the reaction gas. By way of example, if the reactive material consists of chromium, and chromium oxide or chromium nitride may be formed by oxidizing or nitridizing the reactive material chromium, so that the volume of the regions is inflated and the surface of the layer is therefore raised partially to form subtle projections.

At this time, if the second film of the nonreactive material is formed on the first film to have a film thickness which does not to form continuous films in a plane direction, density of the projection and diameter and height of the projection may be controlled appropriately by adjusting the second film thickness. In addition, if the nonreactive material consists of a silicon oxide film added with carbon, density of the projection and diameter and height of the projection may also be controlled appropriately since density and size of carbon included portions may be adjusted by varying the carbon contained amount.

As stated before, according to the method for forming the rough surface, the surface of the substrate may be readily rendered rough so as to achieve the appropriate rough surface. This method for forming the rough surface makes it possible to form the magnetic recording medium which is subjected to the texture processing.

According to other magnetic recording medium of the present invention, since the method for forming the rough surface may be applied to the protection layer formed on the recording layer, the rough surface of the recording layer will not be caused. As a result, a surface of the recording layer can be prevented to rough, thus medium noise generated in the magnetic recording medium is suppressed.

Furthermore, if the magnetic disk is employed in the magnetic recording drive using a CSS scheme, it can operate only at the time of operation start and stop where the sticking is considered seriously since an inner circumferential portion and an outer circumferential portion of the magnetic disk are treated by the method for forming the rough surface of the layer. Thereby, since the texture processing may be applied to only necessary portion, it is feasible to reduce the medium noise due to the rough surface of the recording layer.

In the case of partial texture processing as above, a laser light is available effectively as a heating means.

BRIEF DESCRIPTION OF THE DRAWINGS

FIG. 3 is a view illustrating a first embodiment of the present invention, wherein FIG. 3A is a sectional view showing a fragmentary magnetic recording medium before surface process being conducted, and FIG. 3B is an enlarged view showing a pertinent portion of the magnetic recording medium in FIG. 3A;

FIGS. 4A and 4B are views illustrating the first embodiment of the present invention, wherein FIG. 4A is a sectional view showing a fragmentary magnetic recording medium after surface process being conducted, and FIG. 4B is an enlarged view showing a pertinent portion of the magnetic recording medium in FIG. 4A;

FIGS. 7A and 7B are views illustrating a third embodiment of the present invention, wherein FIG. 7A is an enlarged view showing a pertinent portion of a magnetic recording medium before surface process being conducted, and FIG. 7B is an enlarged view showing the pertinent portion of the magnetic recording medium after surface process being conducted;

FIGS. 8A and 8b are views illustrating a fourth embodiment of the present invention, wherein FIG. 8A is an enlarged view showing a pertinent portion of a magnetic recording medium before surface process being conducted, and FIG. 8B is an enlarged view showing the pertinent portion of the magnetic recording medium after surface process being conducted;

FIGS. 9A and 9B are views illustrating fifth to seventh embodiments of the present invention, wherein FIG. 9A is a sectional view showing a fragmentary magnetic recording medium before surface process being conducted, and FIG. 9B is a sectional view showing the fragmentary magnetic recording medium after surface process being conducted;

DESCRIPTION OF THE PREFERRED EMBODIMENTS

Figure 1:
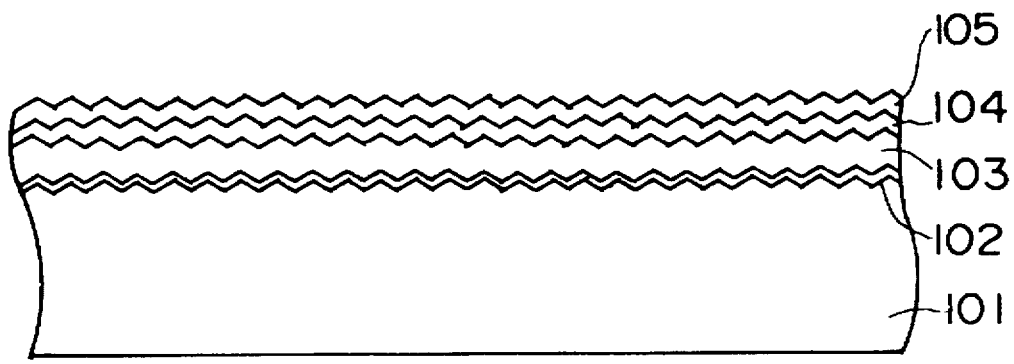
FIG. 1 is a sectional view showing a fragmentary magnetic recording medium for purposes of illustrating a first conventional example.
Figure 2:
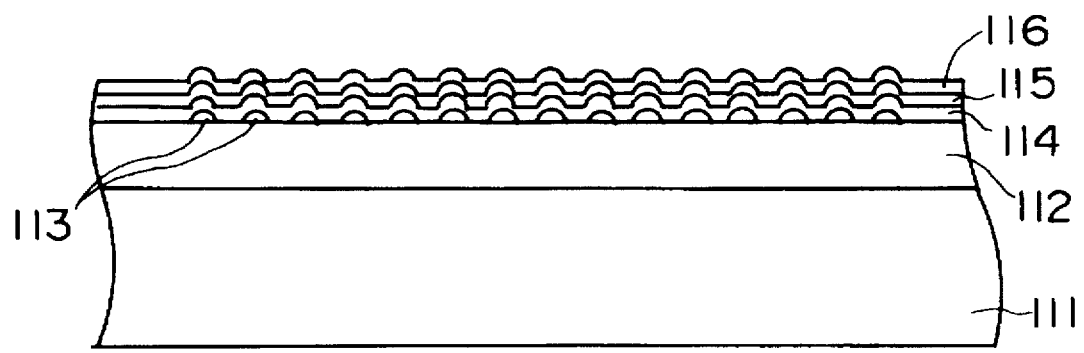
FIG. 2 is a sectional view showing a fragmentary magnetic recording medium for purposes of illustrating a second conventional example.

There will now be described in detail a magnetic recording medium and a method for manufacturing the same according to preferred embodiments of the present invention hereinafter with reference to the accompanying drawings.
First Embodiment)

FIGS. 3, 4A and 4B show a magnetic recording medium according to a first embodiment of the present invention. FIG. 3A is a sectional view showing a fragmentary magnetic recording medium before surface process being conducted, and FIG. 3B is an enlarged view showing a pertinent portion of the magnetic recording medium in FIG. 3A. FIG. 4A is a sectional view showing a fragmentary magnetic recording medium after surface process being conducted, and FIG. 4B is an enlarged view showing a pertinent portion of the magnetic recording medium in FIG. 4A.

In FIGS. 3A and 4A, a reference 1 denotes a disk substrate such as glass, Si, etc.; 2. base film such as Cr; and 3, recording film formed of a hard magnetic material. The recording film 3 is formed of CoCrPt, CoCrTa, CoCrPtTa, Fe-SiO$_2$ granular, or Co, Ni, Fe or an amorphous material containing Co. A reference 4 denotes a multilayered protection film which is formed of plural thin layers made of different materials in the first embodiment. A protection film 4a shown in FIG. 4A correspond to a protection film 4 in FIG. 3A a surface of which is rendered rough, as described later.

FIG. 3B shows an enlarged configuration of the protection film 4. A particle 5 shown by hatching in FIG. 3B denotes a carbon particle, and a particle 6 shown by a white round mark denotes a particle composed of other kind of an element such as Al, Cr, Zr, Hf, Ti, Si, Mg or a kind of their oxide, nitride, carbide or several kinds of them. In the first embodiment, the particles 5 and 6 are formed alternatively as extremely thin films, that is, they are formed to have a thin film thickness in such an extent that they do not form continuous planar layers, for example, 5 to 50 Å, as shown in FIG. 3B. The multilayered protection film 4 has an enough thickness to protect the recording film 3.

As described above, in the magnetic medium of the first embodiment, the protection film 4 has a multilayered structure in which the first layer formed of carbon atoms and the second layer formed of the above material are alternatively formed. As shown, an uppermost layer of the protection film 4 is a carbon atom layer.

The protection film 4 has a smooth surface in this stage shown in FIGS. 3A and 3B, then an uneven surface is formed by treating the surface of the protection film in the first embodiment as shown in FIGS. 4A and 4B. In other words, the surface of the medium is rendered rough by heating the magnetic recording medium shown in FIG. 3 in the air or in a gas containing an oxygen to cause oxidation reaction in the carbon atom layer partially or totally, then vaporizing it. FIG. 4B shows an enlarged and exposed state of the second layer beneath the carbon atom layer by removing the uppermost layer of the carbon atom layer in FIG. 3B by selective etching. As the result of the etching, an uneven shape is formed on the surface of the protection film 4 to render the surface rough.

It will be understood that the surface process may be conducted by oxygen plasma process or UV irradiation process in an oxygen containing atmosphere. For comparison's sake, when the protection film formed only of carbon atoms is annealed for ten minutes at 400° C. in a gas containing an oxygen, an uneven shape having a height of about 30 Å might be formed on the surface of the protection film. On the other hand, in the protection film having a multilayered structure of the first embodiment, since part of the carbon layer can be vaporized but particles of other material near the vaporized carbon cannot be vaporized, the surface of the medium may be rendered more rough.

In the oxygen plasma process for two minutes at 600 W, an advantage could be attained to have the almost same level as that obtained by annealing process for ten minutes at 400° C. in the oxygen atmosphere. The UV irradiation process using the low pressure mercury lamp for 60 minutes in the air could attain an advantage to have the same level as that attained by annealing process in the oxygen atmosphere.
(Second Embodiment)

Figure 5:
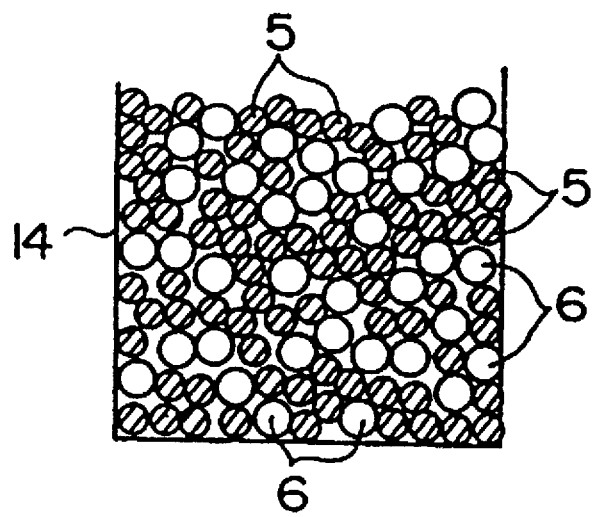
FIG. 5 is a view illustrating a second embodiment of the present invention, and is an enlarged view showing a pertinent portion of the magnetic recording medium before surface process being conducted.
Figure 6:
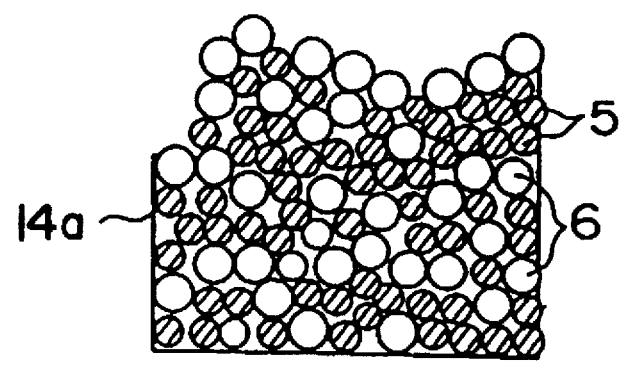
FIG. 6 is a view illustrating the second embodiment of the present invention, and is an enlarged view showing a pertinent portion of the magnetic recording medium after surface process being conducted.

FIGS. 5 and 6 show a magnetic recording medium according to a second embodiment of the present invention. In the second embodiment, instead of the protection film 4 having the multilayered structure shown in FIGS. 3A and 3B, a composite protection film 14 is used wherein carbon particles and the second particles other than the carbon particles which are the same as used in the first embodiment are mixed. Respective configurations of the magnetic disk substrate 1, the base film 2 and the recording film 3 are identical to those of the first embodiment shown in FIGS. 3A and 3B, and therefore their detail explanations are omitted.

FIG. 5 shows an enlarged configuration of the composite protection film 14. A particle 5 shown by hatching in FIG. 5 denotes a carbon particle, and a particle 6 shown by a white round mark denotes a particle of atom or molecule other than the carbon. The composite protection film 14 may be formed by simultaneously forming films of different materials on the recording film 3 using a composite target or a plurality of targets (one kind being carbon, while other kind being an element such as Al, Cr, Zr, Hf, Ti, Si, Mg or a kind of their oxide, nitride, carbide or several kinds of them).

Though the protection film 14 has a smooth surface in this stage shown in FIG. 5, an uneven shape of the surface of the medium shown in FIG. 6 may be accerelated by heating the magnetic recording medium in the air or in a gas containing oxygen to oxidize the carbon partially or totally, then vaporizing it, so that the composite protection film 14a having a rough surface thereon may be formed. In this case, like the first embodiment, oxygen plasma process or UV irradiation process in an oxygen containing atmosphere may provide the same advantage.

For instance, by heating for ten minutes at 400° C. in an oxygen atmosphere, an uneven shape having a height of about 30 Å might be formed on the surface of the protection film of the carbon atom single layer. In the protection film formed of the composite film the second embodiment, since part of the carbon layer can be vaporized but particles of other material cannot be vaporized, the surface of the medium may be rendered more rough.

In the oxygen plasma process for two minutes at 600 W, an advantage could be attained to have the almost same level as that obtained by heating process for ten minutes at 400° C. in the oxygen atmosphere. The UV irradiation process using the 200 W low pressure mercury lamp for 60 minutes in the air could attain an advantage to have the same level as that attained by annealing process in the oxygen atmosphere.

(Third Embodiment)

Figure 7A:
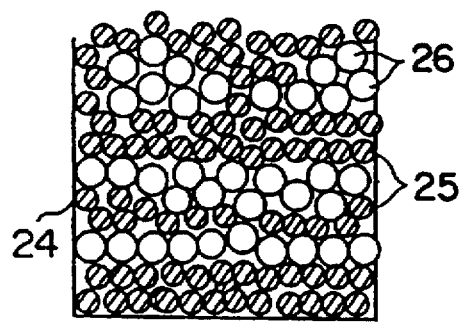
Figure 7B:
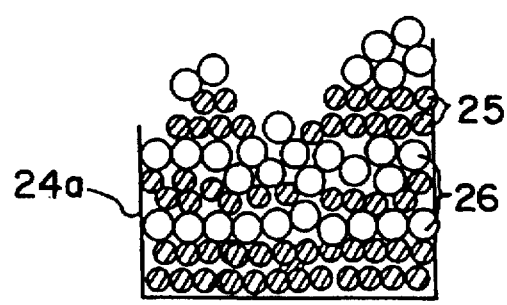

FIGS. 7A and 7B show a magnetic recording medium according to a third embodiment of the present invention. In the magnetic recording medium of the third embodiment, the protection film 24 having a multilayered structure formed of an $SiO_2$ layer and a carbon particle layer is formed in place of the protection films 4, 4a shown respectively in FIGS. 3A and 4A, then the protection film 24 is treated by selective etching such as plasma etching process in a atmosphere of a gas containing fluorine ($CF_4$, etc.) or a gas containing chlorine ($CCl_4$, $Cl_2$, $BCl_3$, etc.) to thus render the surface of the protection film rough.

FIG. 7A shows an enlarged configuration of the protection film 24 before selective etching being conducted. FIG. 7B shows an enlarged configuration of the protection film 24 after selective etching being conducted. Respective configurations of the magnetic disk substrate, the base film and the recording film are identical to those of the first embodiment, and therefore their detail explanations are omitted.

In FIGS. 7A and 7B, a particle 25 shown by hatching denotes an $SiO_2$ particle, and a particle 6 shown by a white round mark denotes a particle of carbon atom. As shown, layers of the particles 25 and layers of the particles 26 may be alternatively formed through the protection film 24.

In the third embodiment, the uppermost layer is formed of the $SiO_2$ layer. Like the first embodiment, respective layers are formed to have a sufficiently thin film thickness in such an extent that they do not form continuous planar layers. As shown in FIG. 7B, the protection film 24 is subjected to $CF_4$ plasma etching process to obtain the rough surface. In other words, the $SiO_2$ layer on the surface of the protection film 24 may be vaporized partially or totally by this etching process so that the surface of the protection film 24 is formed to be rough.

Next, a method of manufacturing the magnetic recording medium according to the third embodiment will be stated hereinafter. First, a base film such as Cr is formed on a well cleaned and sufficiently smooth surface of a disk substrate (Si), then a recording film of a hard magnetic material is formed thereon. Detailed materials of the substrate, the base film, and the recording film are similar to those of the first embodiment. Respective 5 $SiO_2$ and C particle layers, each having a film thickness (e.g., 10 Å thickness) not to form a continuous and planar film on the recording film, are formed at a film thickness ratio of 1:1 up to a total thickness of 500 Å. Sputtering technique is used as the forming process. As a result, the protection film 24 having a structure shown in FIG. 7A may be formed.

Though the protection film has a smooth surface in the stage stated above, an uneven shape of the surface of the protection film as shown in FIG. 7B may be formed by treating the magnetic recording medium by means of $CF_4$ plasma etching process to vaporize the $SiO_2$ protection film partially or totally. The plasma etching will be effected by reacting a plenty of fluorine radical (F*) existing in the plasma to $SiO_2$ to thus generate $SiF_4$ as follows.

$$SiO_2 + F^* \rightarrow SiF_4 + O_2$$

According to combination of the above materials, the rough surface having a projection height Rp (size of the projection) of 100 Å could be realized by the plasma etching process for two minutes, at 300 W, 20 mTorr. It will be understood that, in the third embodiment, a material such as Si, SiC, $Si_3N_4$ may be used in place of $SiO_2$ particles 25.

According to combination of these materials, plasma process times required for forming the rough surface having the projection height of about 100 Å are summarized in Table I.

TABLE I

| MATERIAL | FILM THICKNESS RATIO | PLASMA PROCESS TIME UNTIL RP OF 100Å |
|---|---|---|
| Si/C | (1 nm/1 nm) × 5 | 1.2 |
| $SiO_2$/C | (1 nm/1 nm) × 5 | 2 |
| Si/C | (1 nm/1 nm) × 5 | 1.5 |
| $Si_3N_4$/C | (1 nm/1 nm) × 5 | 1.7 |

(300 W, 0.02 Torr)

(Fourth Embodiment)

Figure 8A:
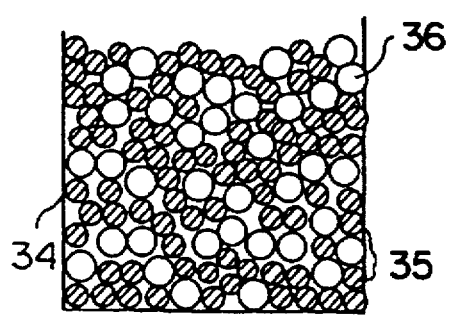
Figure 8B:
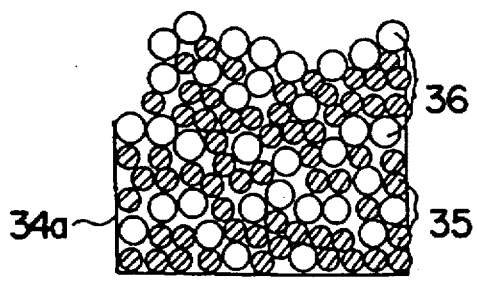

FIGS. 8A and 8B illustrate a fourth embodiment of the present invention. FIGS. 8A and 8B are enlarged views showing the protection films 4, 4a in the magnetic recording medium having the structure shown in FIGS. 3A and 4A including the feature of the fourth embodiment. In this embodiment, the protection film 34 is formed of a mixed film of Al or $Al_2O_3$ particles 35 and C particles 36. The magnetic recording medium is formed as follows. First, a base film such as Cr is formed on a well cleaned and sufficiently smooth surface of a disk substrate (Si), then a recording film is formed thereon. Detailed materials of these films are similar to those of the first embodiment.

After this, using a composite target having Al and C or plural targets, films of different materials are formed to achieve a composite protection film 34 with a structure shown in FIG. 8A. Though the protection film 34 has a smooth surface in this stage, the protection film 34 is treated by $CCl_4$ plasma etching process to let Al atoms react to $Cl_2$, chlorine radical etc. so that Al may be applied partially or totally. As a result, an uneven shape of the surface of the protection film 34 may be formed. FIG. 8B shows the protection film 34a in an enlarged fashion after the rough surface being formed. As shown in FIG. 8B, Al or $Al_2O_3$ particles have been removed from the surface of the protection film after the plasma process being conducted.

If the particle 35 is formed of Al and also the ratio of Al and C is 1:1, clear compound peak could not be confirmed by the X-ray diffraction method. It may be considered that the protection film 34 is made of amorphous or fine particles. If a volume ratio of Al and C is 1:1, the $CCl_4$ plasma etching process for five minutes, at 200 W, 0.2 Torr is required to form the projection height Rp up to 100 Å on the rough surface of the protection film. On the contrary, if the particles 35 are formed of $Al_2O_3$ and the particles 36 are formed of C, the plasma process was required for 35 minutes under the same condition. According to combination of these materials, plasma process times required for forming the rough surface are summarized in Table II.

TABLE II

| MATERIAL | VOLUME RATIO | PROTECTION FILM THICKNESS | PLASMA PROCESS TIME UNTIL RP of 100Å |
|---|---|---|---|
| Al—C | 1:1 | 10 | 5 |
| $Al_2O_3$—C | 1:1 | 10 | 35 |

(300 W, 0.02 Torr)

(Fifth Embodiment)

Figure 9A:
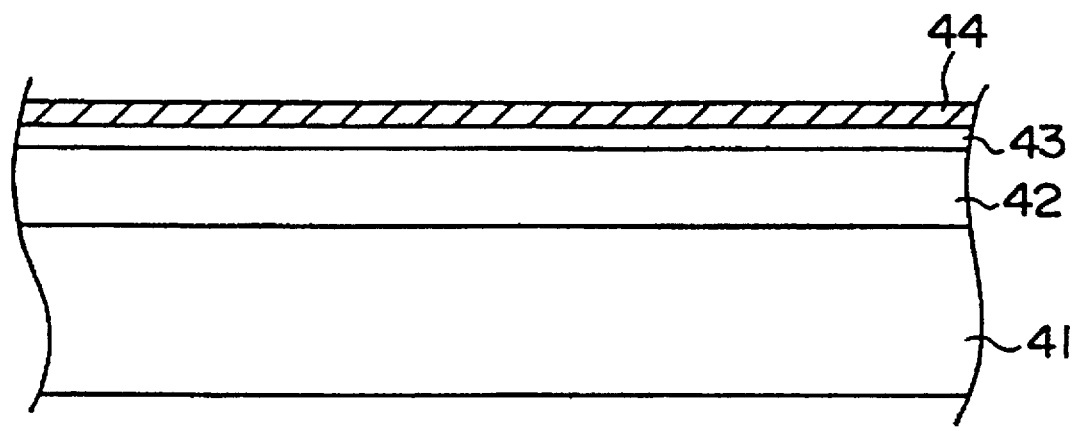
Figure 9B:
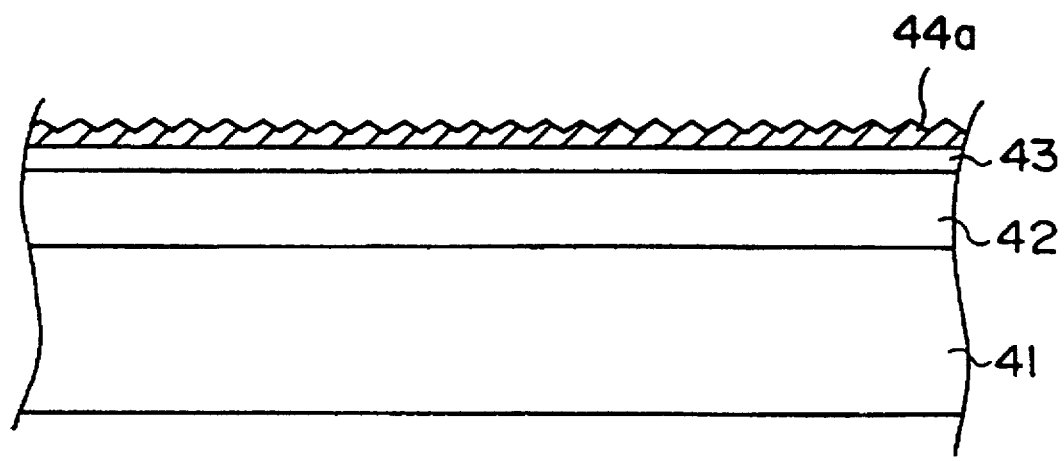

FIGS. 9A and 9B are sectional views illustrating a magnetic recording medium according to the fifth embodiment of the present invention. Especially, FIG. 9A shows a fragmentary magnetic recording medium before surface process being conducted, while FIG. 9B shows the fragmentary magnetic recording medium after surface process being conducted. In the fifth embodiment, a base film 42 and a recording film 43 are formed on a disk substrate 41, and a protection film 44 is formed of a amorphous or fine particle thin film, and the protection film 44 is treated by heat treatment in vacuum or at inert gas atmosphere such as nitrogen, argon, etc. so that fine particles on at least the surface of the protection film may be crystallized (coarse particles) to render the surface rough.

In the fifth embodiment, the magnetic recording medium may be formed as follows. First, a base film (such as Cr) 42 and a recording film (CoCrPt) 43 are formed on a well cleaned and sufficiently smooth surface of a disk substrate 41 (any material may be available). An amorphous protection film 44, e.g., $Ag_5Bi_{95}$ (atom %, referred to as at % hereinafter) is then formed thereon by sputtering technique using argon gas etc. to have a film thickness of about 150 to 200 Å. As shown in FIG. 9A, the protection film has a smooth surface in this stage yet.

Next, the disk substrate 41 is annealed in vacuum to crystallize the amorphous protection film 44 partially or totally. As shown in FIG. 9B, the protection film 44a having a raised height on the surface Rp of about 100 Å can thus be derived after process. Inert gas such as nitrogen or argon, for example, may be used as the annealing atmosphere. It is important not to oxidize the surface. As described above, the magnetic recording medium having the enoughly rough surface may be derived.

It has been confirmed by the electron beam diffraction that the raised height (projection) shown in FIG. 9B may be formed by the crystal particles. The protection film 44 is not always formed by the amorphous material, but it may be formed by the fine particles each having a diameter of less than 100 Å, for example. Even in this state, it is feasible to achieve projections having a diameter of about 200 Å, for example, by annealing.

In case the protection film 44 is formed of $Ag_5Bi_{95}$ film, it is preferable that more than 260° C. should be used as the annealing temperature to render the surface rough sufficiently. However, the temperature must be suppressed not to lower the magnetic characteristic of the recording film 43. For instance, in case CoCrPt system material is used as the recording film 43, the temperature of less than 400° C. would be preferable. As the composition by which crystallization can be caused under the annealing condition of less than 400° C., Bi composition of 65 at % or more is required in AgBi film.

Although not shown, a carbon film may be formed as the second protection film on the protection film 44.

To clear and confirm the advantage achieved by the fifth embodiment, kinetic friction coefficient between the magnetic head and the magnetic disk has been measured while contacting the ordinary magnetic head to the surface of the magnetic disk drive, and the result is then compared to that of the disk device having the conventional structure. The magnetic recording medium of the fifth embodiment has been used wherein the base film of Cr (thickness t=600 Å), the recording film of $Co_{82}Cr_{13}Pt_5$ (t=200 Å) and the protection film of $Ag_5Bi_{95}$ (t=200 Å) are formed in order on the glass disk substrate. The lubricant has then been applied to a thickness of 10 Å on the surface of the resultant structure to accommodate it to the actual condition. After this, the ordinary head has been contacted to the surface of the magnetic disk to measure the kinematic friction coefficient between the magnetic disk and the magnetic head at a sliding speed of 100 rpm. Here the film thickness of the lubricant has been set to a required minimum thickness, which may be calculated from the measured value derived by X-ray photoelectron spectroscopy (XPS).

Figure 10:
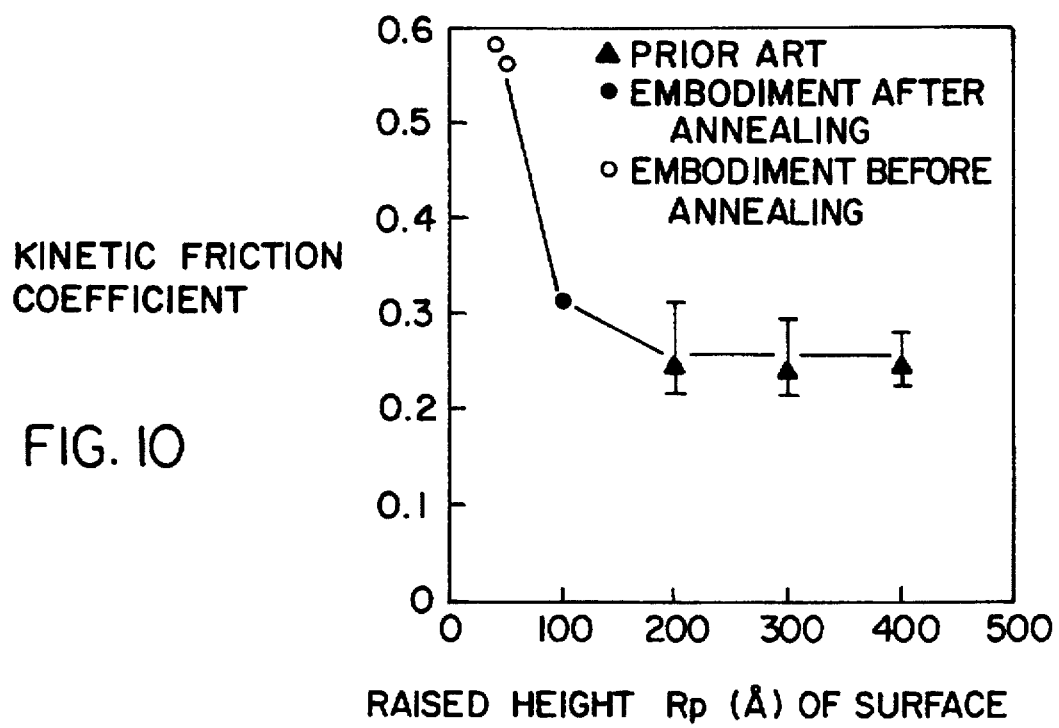
FIG. 10 is a characteristic view showing a relation between raised height of surface and kinetic friction coefficient to explain an advantage attained by the magnetic recording medium which is manufactured according to the fifth embodiment of the present invention.

In FIG. 10, a relation between raised height Rp of the surface and kinetic friction coefficient of the disk device formed as described above is shown. In FIG. 10, a mark ○ shows the value of kinetic friction coefficient derived by the disk device formed as discussed above before annealing, and a mark ● shows the value of the same after annealing. In addition, a mark ▲ shows the value of kinetic friction coefficient derived by the conventional magnetic recording medium wherein the mechanical texture is applied to the NiP film coated Al substrate. As is evident from FIG. 10, in the magnetic disk drive of the fifth embodiment after annealing being done, the kinetic friction coefficient is low to be 0.31 for the raised height Rp of the surface of about 100 Å, which is comparable to the conventional value derived by the magnetic recording medium having the conventional mechanical texture thereon.

Figure 11:
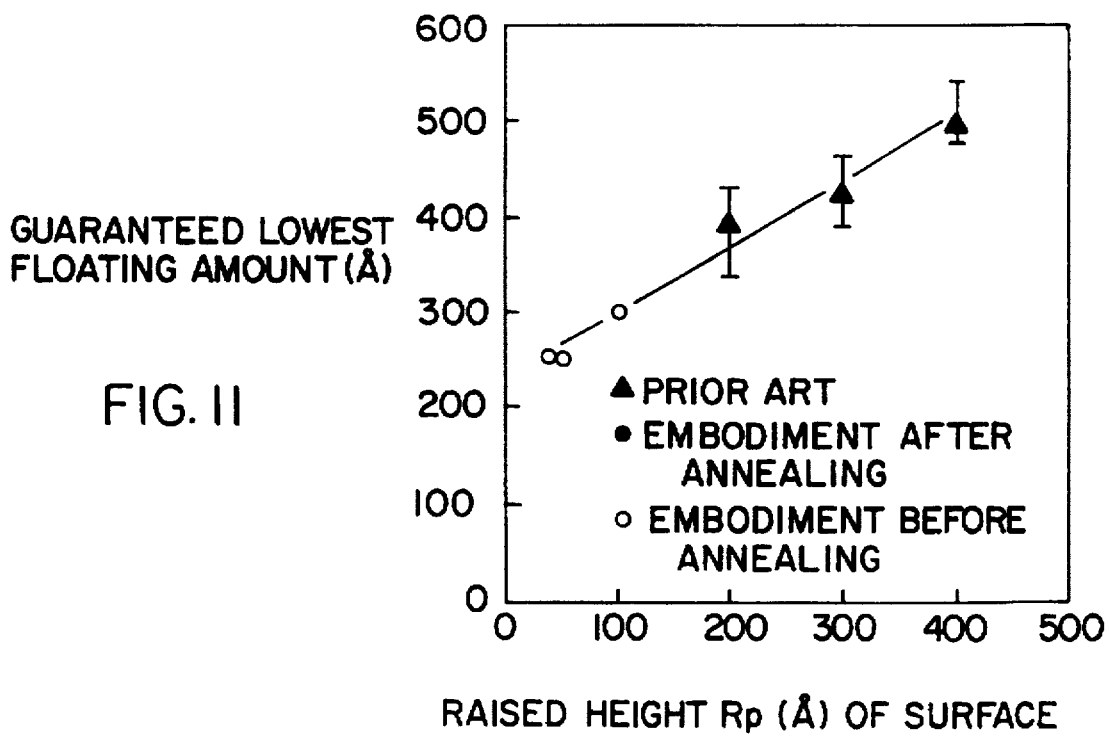
FIG. 11 is a characteristic view showing a relation between raised height of surface and guaranteed lowest floating amount to explain an advantage attained by the magnetic recording medium which is manufactured according to the fifth embodiment of the present invention.
Figure 12:
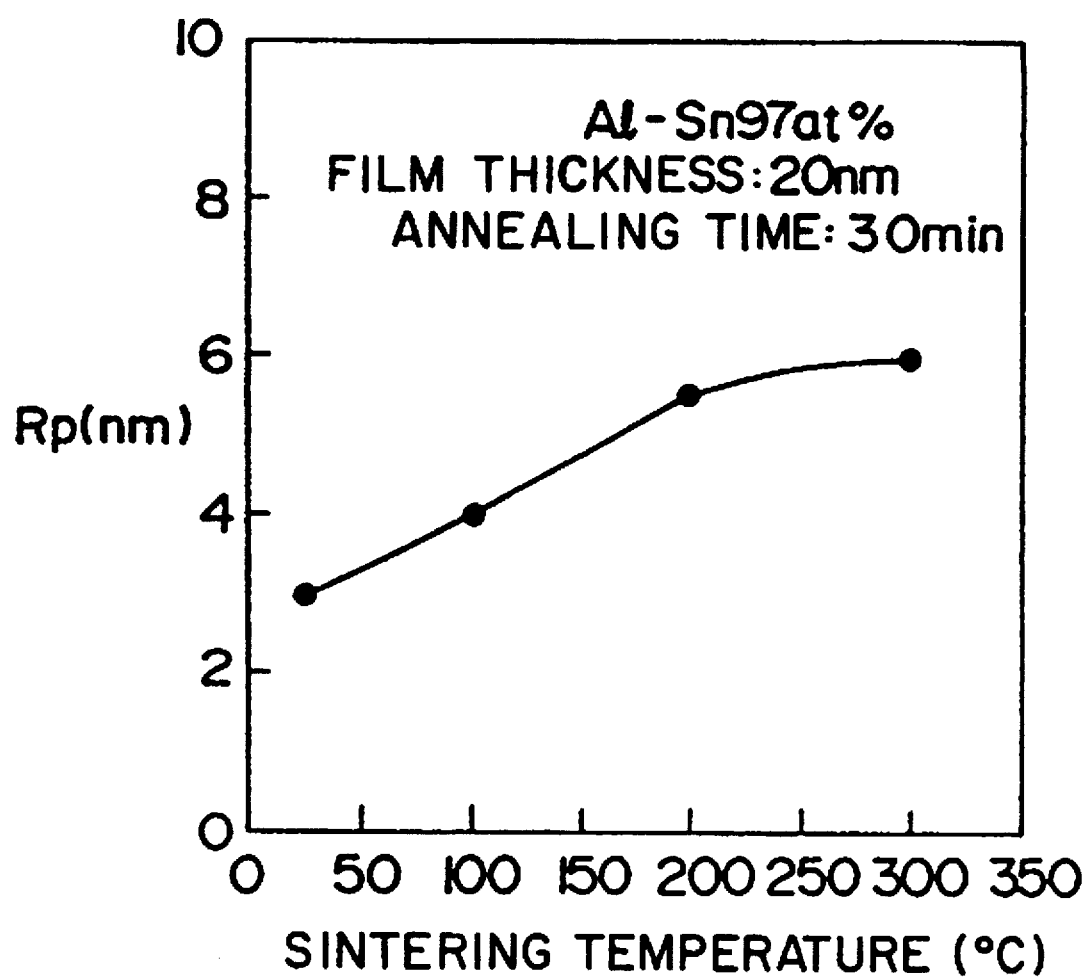
FIG. 12 is a characteristic view illustrating the sixth embodiment of the present invention, and is a view showing a relation between sintering temperature and raised height of surface of a protection film.

Furthermore, a relation between raised height Rp of the surface of the magnetic disk drive and guaranteed lowest floating amount is shown in FIG. 11. Here the guaranteed lowest floating amount can be defined as a floating amount which commences to come into contact with the disk substrate when the floating amount of the magnetic head is reduced gradually. In FIG. 11, a mark ○ shows the value of guaranteed lowest floating amount derived by the disk device formed as discussed above before annealing, and a mark ● shows the value of the same after annealing. In addition, a mark ▲ shows the value of guaranteed lowest floating amount derived by the conventional magnetic recording medium wherein the mechanical texture is applied to the NiP film coated Al substrate. It may be understood from FIG. 11 that raised height Rp of the surface must be suppressed lower than 400 Å to suppress the guaranteed lowest floating amount less than 500 Å.

With the above, the height of about 100 Å to 400 Å is appropriate as raised height Rp of the surface to guarantee low friction coefficient and low floating amount. It may thus be apparent that the magnetic recording medium of the fifth embodiment can satisfy such requirement.

(Sixth Embodiment)

In the sixth embodiment, AlSn is used as a material of the protection films 44, 44a in place of AgBi in the fifth embodiment. AlSn has lower crystallization temperature than AgBi, and $Al_3Sn_{97}$ may have 230° C. at most. But, at this time, as the composition which enables crystallization to be generated by annealing of less than 400° C., Si composition of more than 90 at % is needed. In FIG. 10, a change of surface roughness in vacuum annealing of AlSn film is shown by a relation between raised height Rp of the surface and kinetic friction coefficient. In the experiment, AlSn film having the Sn composition ratio of 97% and the film thickness of 20 nm is annealed for 30 minutes.

(Seventh Embodiment)

As shown in FIG. 9A, a base film (such as Cr) 42 and a recording film (CoCrTa) 43 are formed on a well cleaned and sufficiently smooth surface of a disk substrate 41. An amorphous film or fine particle film 44 is then formed thereon by sputtering technique etc. to have a film thickness of about 150 to 200 Å. Here the fine particle may be defined as a crystal having a diameter of less than 100 Å. As a material of the amorphous film or fine particle film, the following alloy may be listed. That is, there are $Al_{70}Ge_{30}$, $Al_{13}La_{87}$, $Al_{89}Si_{11}$, $Al_{13}Te_{87}$, $Au_{63}Ge_{27}$, $Au_{64}Sb_{36}$, $Au_{82}Si_{18}$, $Pt_{67}Sb_{33}$, $Ag_{22}Ce_{78}$, $Ag_{74}Ge_{26}$, $Ag_{29}La_{71}$, $Ag_{59}Sb_{41}$ (Respective numerals are expressed by at %).

Although the protection film 44 has a smooth surface in this stage yet, the protection film 44a having the rough surface may be obtained as shown in FIG. 9B, if the magnetic disk is annealed in vacuum to crystallize the amorphous film (or microcrystalline film) partially or totally. Inert gas such as nitrogen or argon, for example, may be used as the annealing atmosphere.

The annealing temperature is in a range of 360° C. to 650° C. if the above material is utilized. By keeping this temperature for about one hour, the raised height Rp of the surface may be readily realized up to about 100 Å. The medium having a low friction coefficient for the magnetic head can thus be finished.

In the seventh embodiment, the material of substrate may be limited since relatively high temperature is required for the heat treatment. Widely used NiP coated Al substrate cannot be utilized because NiP is crystallized to be magnetized and the substrate thus becomes as a noise source.

Alternatively, silicon substrate, glass (especially crystallized glass) substrate, or carbon substrate may be suitable.

The followings are composition ranges wherein crystallization temperature is less than 650° C. in the above materials.

$Al_aGe_{100-a}$ ($10 \leq a \leq 40\%$), $Al_bLa_{100-b}$ ($82 \leq b \leq 92\%$), $Al_cSi_{100-c}$ ($2 \leq c \leq 15\%$), $Al_dTe_{100-d}$ ($78 \leq d \leq 99\%$), $Au_eGe_{100-e}$ ($20 \leq e \leq 44\%$), $Au_fSb_{100-f}$ ($28 \leq f \leq 67\%$), $Au_gSi_{100-g}$ ($67 \leq g \leq 85\%$), $Pt_hSb_{100-h}$ ($66 \leq h \leq 68\%$), $Ag_iCe_{100-i}$ ($20 \leq i \leq 25\%$), $Ag_jGe_{100-j}$ ($72 \leq j \leq 76\%$), $Ag_kLa_{100-k}$ ($23 \leq k \leq 32\%$), $Ag_mSb_{100-m}$ ($11 \leq m \leq 78\%$) (where % is indicated by at %).

If the material having the above composition being used, the same results can be derived by annealing for one hour at 650° C.

As stated before, according to the first to seventh embodiments, the surface of the magnetic recording medium may be easily rendered rough by treating the protection film protecting the recording film of the magnetic recording medium by surface process such as etching or annealing.

Therefore, it is possible to provide a method for manufacturing a magnetic recording medium with high reliability by rendering simply a surface of a magnetic recording medium rough.

(Eighth Embodiment)

FIGS. 13A, 13B, 13C and 13D are sectional views showing a method for forming a rough surface of a nonmagnetic substrate and a method for manufacturing a magnetic recording medium according to an eighth embodiment of the present invention.

Figure 13A:
FIGS. 13A, 13B, 13C and 13D are sectional views showing a method for forming a rough surface of a nonmagnetic substrate and a method for manufacturing a magnetic recording medium according to an eighth embodiment of the present invention.
Figure 13B:
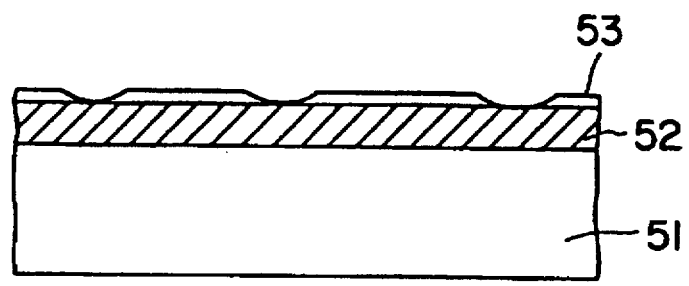

First, a chromium (Cr) film (a first film of reactive material) 52 having a film thickness of about 20 nm is formed, as shown in FIG. 13B, on a well cleaned and sufficiently smooth surface of a silicon substrate 51 as shown in FIG. 13A, by DC magnetron sputtering technique under the conditions that Ar gas pressure is 5 mTorr and power is 0.5 kW.

Subsequently, as shown in FIG. 13B, a silicon oxide film (a second film of nonmagnetic material) 53 is formed on the Cr film 52 by RF magnetron sputtering technique under the conditions that Ar gas pressure is 10 mTorr and power is 0.2 kW. At this time, the film thickness of the silicon oxide film 53 is designed as about 3 nm, for example, not to form continuous film in the planar direction.

Figure 13C:
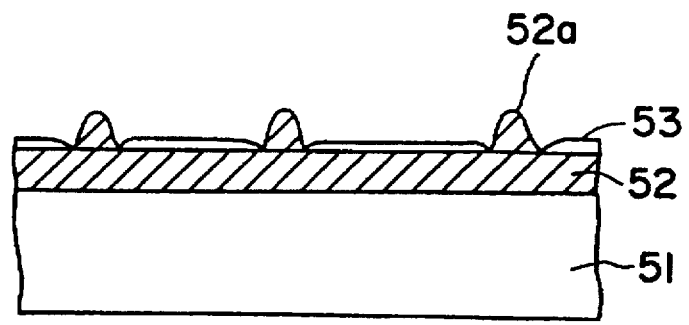
Figure 17:
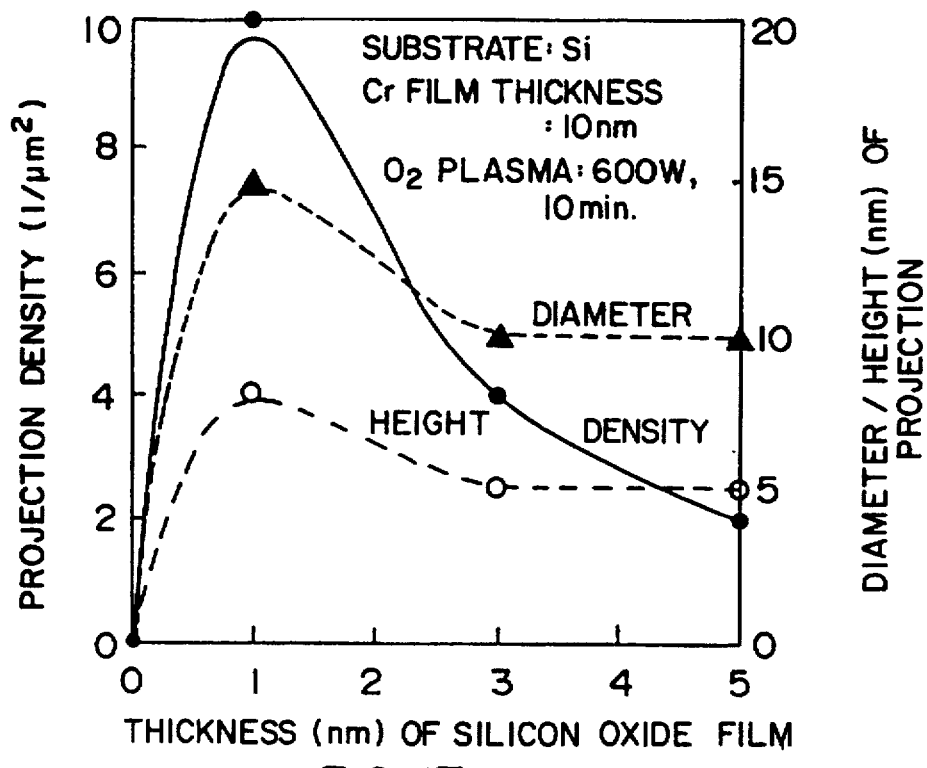
FIG. 17 is a characteristic view illustrating dependencies of projection density, projection diameter, and projection height upon a film thickness of a silicon oxide film in the method for forming the rough surface of the nonmagnetic substrate according to the eighth embodiment of the present invention.

Next, the silicon substrate 51 is placed on one of opposing electrodes of the parallel plate type plasma processing apparatus, then oxygen gas is introduced in the chamber of the apparatus to have a gas pressure of 10 mTorr. Subsequently, the power of 600 W may be applied between the opposing electrodes to plasmanize oxygen gas, and plasma process may be effected for ten minutes. As shown in FIG. 13C, parts of the Cr film 52, which are exposed partially from discontinuous parts of the silicon oxide film 53 on the surface of the substrate, are oxidized by the plasmanized oxygen (reaction gas) to form chromium oxide. The parts may be increased in volume to raise, so that projections 52a are formed. In the eighth embodiment, as shown in FIG. 17, the projections 52a are formed to have a diameter of 10 nm and a height of 5 nm.

As aforementioned, the nonmagnetic substrate being subjected to the texture process can be formed.

Figure 13D:
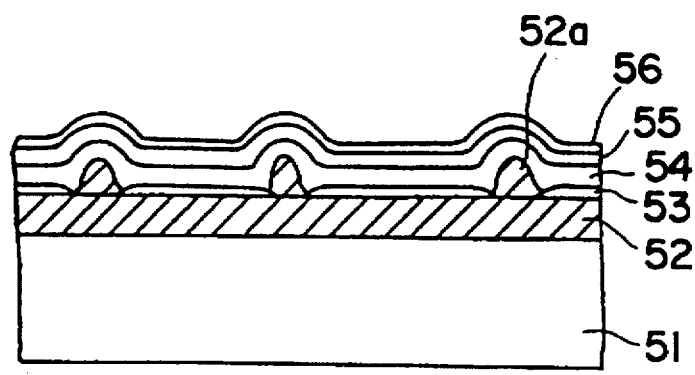

Thereafter, a base layer 54 of Cr film having a film thickness of about 40 nm, a recording layer 55 of CoCrPt film having a film thickness of about 20 nm, and a protection film 56 of C film having a film thickness of about 10 nm are stacked in sequence by sputtering technique etc. on the nonmagnetic medium. Thus, as shown in FIG. 13D, the magnetic recording medium can be completed.

As described above, according to the eighth embodiment of the present invention, the silicon oxide film 53 with the film thickness not to form a continuous film in the planar direction is formed on the Cr film 52, then the surface of the resultant multilayered film is exposed to oxygen plasma so that oxygen is caused to react to the Cr film 52, and then only the reacted parts is raised to thus form projections 52a on the surface of the substrate.

At that time, by adjusting the film thickness of the silicon oxide film 53 and plasma irradiation conditions, density, diameter and height of the projections 52a may be controlled appropriately. The surface of the substrate may therefore be readily formed to have appropriate roughness.

In FIG. 17, an experimental example is illustrated wherein projection density, projection diameter, and projection height may be adjusted by the film thickness of the silicon oxide film 53. The abscissa of FIG. 17 indicates film thickness (nm) of the silicon oxide film in linear scale, while the left ordinate indicates projection density ($1/\mu m^2$) in linear scale and the right ordinate indicates projection diameter (nm) and projection height (nm). These data have been secured under the condition wherein the film thickness of Cr film is 10 nm. Other conditions are identical to the above.

As shown in FIG. 17, projection density, projection diameter, and projection height may show mountain-like changes respectively with the increase of the film thickness of the silicon oxide film. When the film thickness of the silicon oxide film is 1 nm, projection density, projection diameter, and projection height may be at maximum and obtained as 10 $1/\mu m^2$, 8 nm and 15 nm. If the film thickness of the silicon oxide film is more than 3 nm, projection density may be reduced with increase in the film thickness, but projection diameter and projection height may not be changed to be substantially constant.

The height of the projection 52a can also be adjusted by process time and application power. The height of the projection 52a is more reduced if process time becomes shorter or if application power becomes smaller.

In the eighth embodiment, although the multilayered film is exposed to plasmanized oxygen to form the projection 52a, heat treatment may be effected in the oxygen gas. For example, at the heating temperature of 400° C. for 30 minutes, projection density, projection diameter, and projection height could be derived to have the same level as above. In this event, the height of the projection may also adjusted by process time and heating temperature. The height of the projection 52a is more decreased if process time is more shortened or if heating temperature is more lowered. For example, the height was about 2 nm for ten minute process time.

Moreover, in both cases of plasma process and heating process, the advantages have been attained even if nitrogen is used in place of oxygen as process atmosphere.

Further, Cr film has been used as the first film of the reactive material, but it is not limited to Cr film and other materials are be available.

Furthermore, although the silicon oxide film has been utilized as the second film of nonreactive material, it is not restricted to the film, and other films such as silicon nitride film, aluminum oxide film or aluminum nitride film, for example, may be used.

(Ninth Embodiment)

Figure 14A:
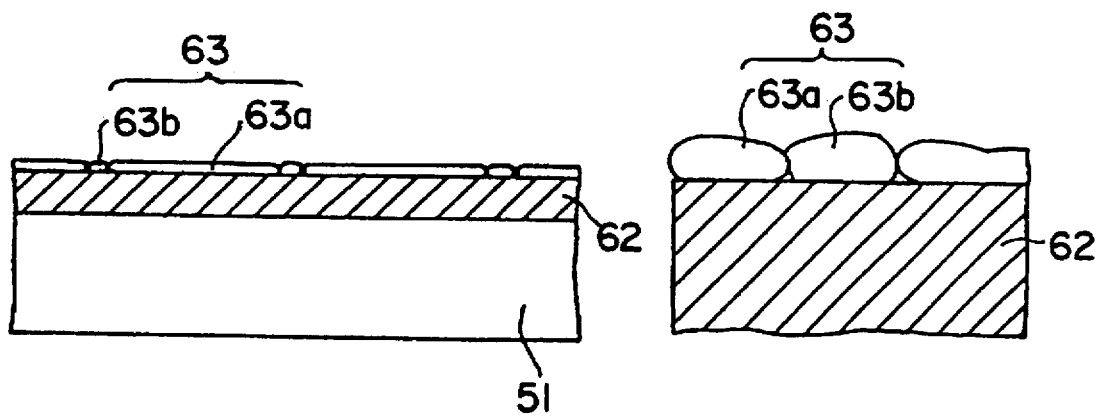
FIGS. 14A, 14B and 14C are sectional views showing a method for forming a rough surface of a nonmagnetic substrate according to a ninth embodiment of the present invention.
Figure 14B:
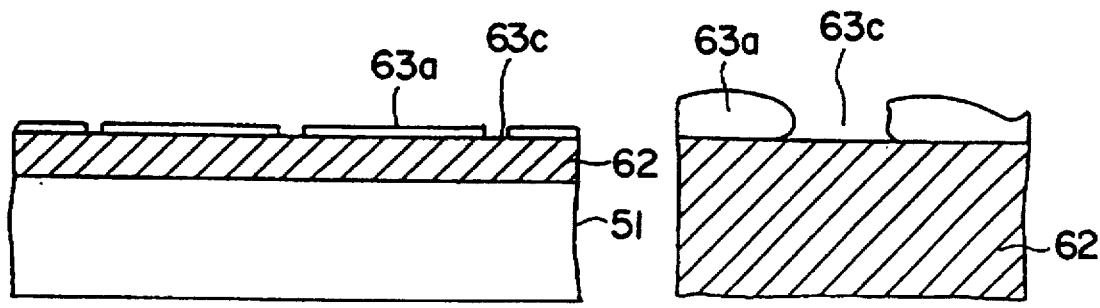
Figure 14C:
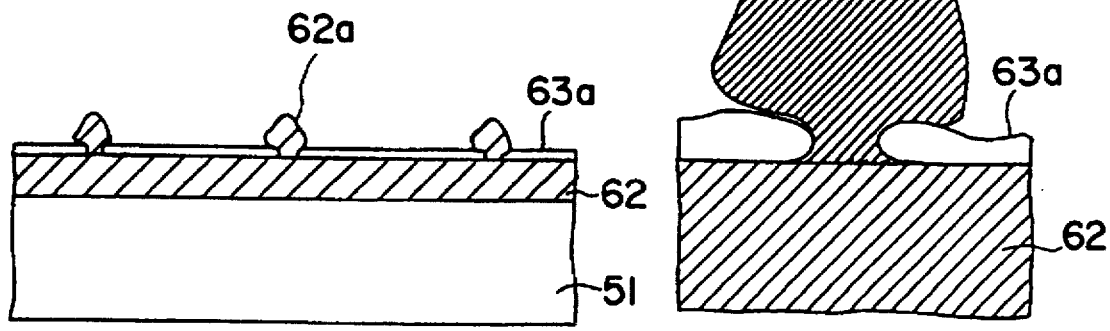

A method of forming a nonmagnetic substrate and a magnetic recording medium according to the ninth embodiment of the present invention will be explained with reference to FIGS. 14A, 14B and 14C. FIGS. 14A, 14B and 14C are sectional views showing the method for forming the nonmagnetic substrate and the magnetic recording medium Respective drawings in the right side are sectional views showing the projection forming portions in an enlarged fashion. In FIGS. 14A, 14B and 14C, identical symbols to those in FIGS. 13A to 13D indicate identical parts in FIGS. 13A, 13B, 13C and 13D.

First, a chromium (Cr) film (a first film of a first material) 62 having a film thickness of about 20 nm is formed on a well cleaned and sufficiently smooth surface of a silicon substrate 51 as shown in FIG. 14A, by DC magnetron sputtering technique under the conditions that Ar gas pressure is 5 mTorr and power is 0.5 kW.

Figure 15:
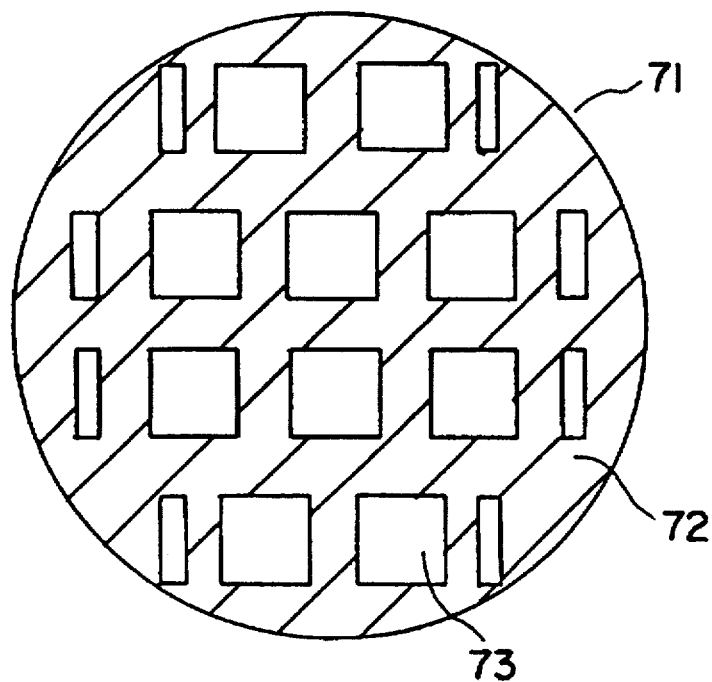
FIG. 15 is a plan view showing a configuration of a sputtering target used in a method for manufacturing a magnetic recording medium according to the ninth embodiment of the present invention.

Subsequently, a insulating film (a second film) 63 of oxides of silicon (a second material) 63a, which includes carbon (C: a third material) 63b therein and has a film thickness of about 5 nm, Is formed on the Cr film 62 by RF magnetron sputtering technique under the conditions that Ar gas pressure is 10 mTorr and power is 0.2 kW. At this time, as shown in FIG. 15, the sputtering target 71 wherein carbon plates 73 are partially adhered to a circular SiO$_2$ plate 72 may be used. To control a carbon containing amount in the silicon oxide film 63, both exposure area of the SiO$_2$ plate 72 and exposure area of the carbon plates 73 are controlled.

The carbon containing amount will be determined substantially in proportion to a ratio of areas (exposure area of the carbon plates/exposure area of the SiO$_2$ plate). On the silicon oxide film 63 formed by sputtering using the above target, carbon collected portions 63a are scattered over the entire area of the silicon oxide film 63a at desired density.

Next, at the oxygen gas pressure of 10 mTorr, plasma generation power of 600 W is applied to execute plasma process for ten minutes. As a result, as shown in FIG. 14B, plasmanized oxygen and carbon in the carbon collected portions 63b react to each other so that the carbon C is caused to be vaporized to be removed. Cr film 62 of the base film is exposed on carbon-removed areas 63. As shown in FIG. 14C, oxygen and Cr of the base film react to each other to form chromium oxide if the plasma process is continued subsequently. The parts may be increased in volume to raise, so that projections (bumps) 62a are formed. In the ninth embodiment, the projections 52a are formed to have a diameter of 100 nm and a height of 50 nm.

As above, the nonmagnetic substrate has been formed.

Thereafter, the magnetic recording medium is finished by forming the base layer, the recording layer and the protection layer via the same steps as those shown in FIG. 13D.

As described above, in the ninth embodiment of the present invention, the silicon oxide film 63 into which C's are added is formed on the Cr film 62, then the surface of the resultant multilayered film is exposed to oxygen plasma so that oxygen is caused to react to the Cr film 62, then C's are removed partially from the silicon oxide film 63, and then the Cr film 62 of the base layer is exposed from the carbon-removed areas 63c. In addition, the surface of the layer is exposed to plasmanized oxygen to react oxygen to Cr of the base layer, thus forming chromium oxide. As a result, the reacted parts is raised to thus form projections 52a on the surface of the substrate.

In this event, by adjusting the carbon containing amount, size and distribution density of the carbon collected portions 63b may be controlled appropriately. Density, diameter, and height of the projection 62a may therefore be readily adjusted.

Figure 18:
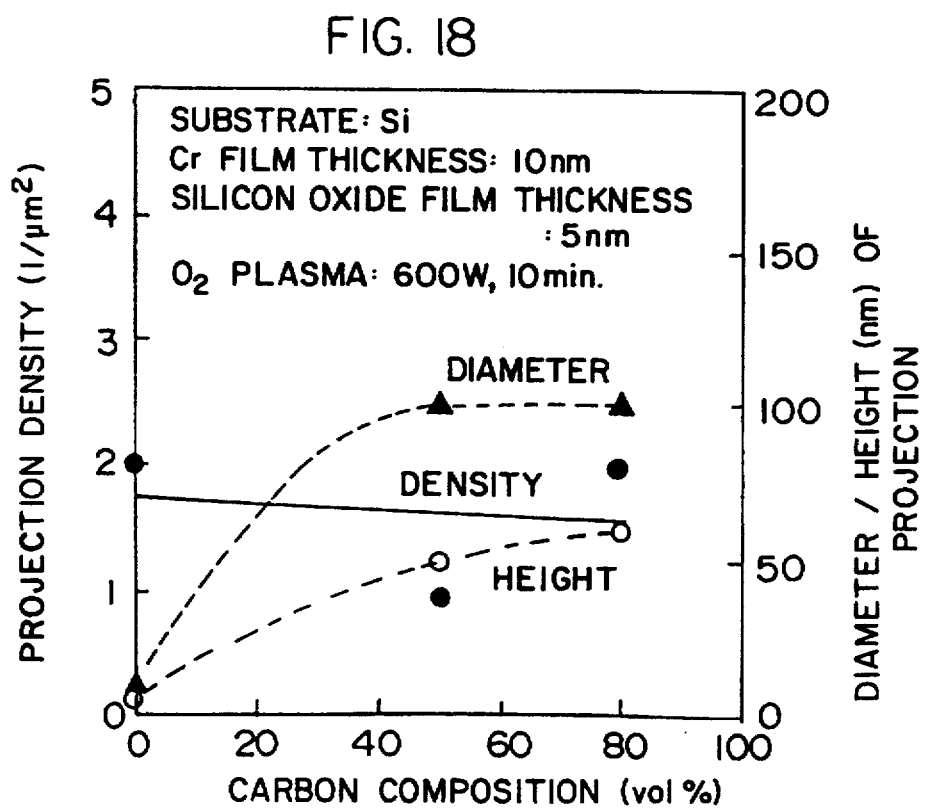
FIG. 18 is a characteristic view illustrating dependencies of projection density, projection diameter, and projection height upon a carbon composition ratio in the method for forming the rough surface of the nonmagnetic substrate according to the ninth embodiment of the present invention.

FIG. 18 is a characteristic view illustrating dependencies of projection density, projection diameter, and projection height upon a carbon composition ratio. The abscissa of FIG. 18 indicates carbon composition ration (vol %), while the ordinate indicates projection density ($1/\mu m^2$), projection diameter (nm) and projection height (nm) in linear scale. These data have been secured under the condition wherein the film thickness of the Cr film is 10 nm. Other conditions are identical to the above.

As shown in FIG. 18, with the increase of the carbon composition ration, projection diameter and projection height may be increased respectively. When the carbon composition ratio is about 50 vol %, projection diameter becomes 100 nm.

Even if the carbon composition ratio is increased more over, projection diameter is seldom changed to be substantially constant. On the other hand, with the increase of the carbon composition ration, projection height may be increased and becomes 60 nm at 80 vol %. However, the dependency of projection density on the carbon composition ratio is small and therefore hardly changed. The change of projection density is 1 to 2 1/μm².

The height of the projection 62a can also be adjusted by process time and application power. The height of the projection 62a is more reduced if process time becomes shorter or if application power becomes smaller. For purposes of example, the height has been 60 to 70 nm if process time is ten minutes, but the height has been reduced to 30 nm if process time is nine minutes.

Like this, if the method for forming the rough surface of the layer being employed, the surface of the substrate can be readily rendered rough to have appropriate surface roughness. It is also possible to achieve the magnetic recording medium to which texture process is applied by that method for forming the rough surface.

If heating process is effected in oxygen gas in place of plasmanized oxygen at 400° C. for 30 minutes, for example, projection density, projection diameter, and projection height having the same level as above could be derived.

Moreover, in both cases of plasma process and heating process, the advantages have been attained even if nitrogen is used in place of oxygen as process atmosphere.

Further, Cr film has been used as the first film of the first reactive material, but it is not limited to Cr film and other materials may also be available.

Furthermore, although the silicon oxide film has been utilized as the second film of nonreactive material, it is not restricted to the film, and other films such as silicon nitride film, aluminum oxide film or aluminum nitride film, for example, may be used.

Besides, although the carbon has been used as the second reactive material, it is not limited to the carbon and other materials such as SiC may be available.

(Tenth Embodiment)

Figure 16A:
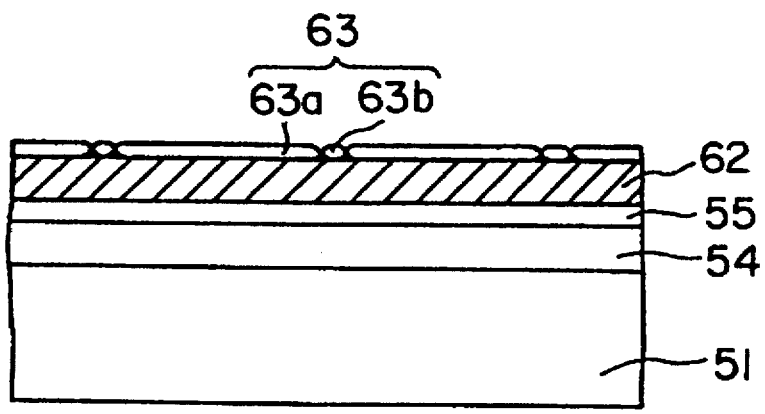
FIGS. 16A, 16B and 16C are sectional views showing a method for manufacturing a magnetic recording medium according to the tenth embodiment of the present invention.
Figure 16B:
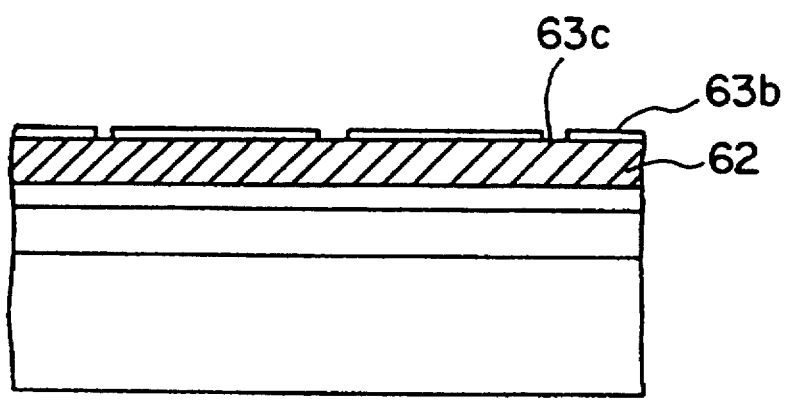
Figure 16C:
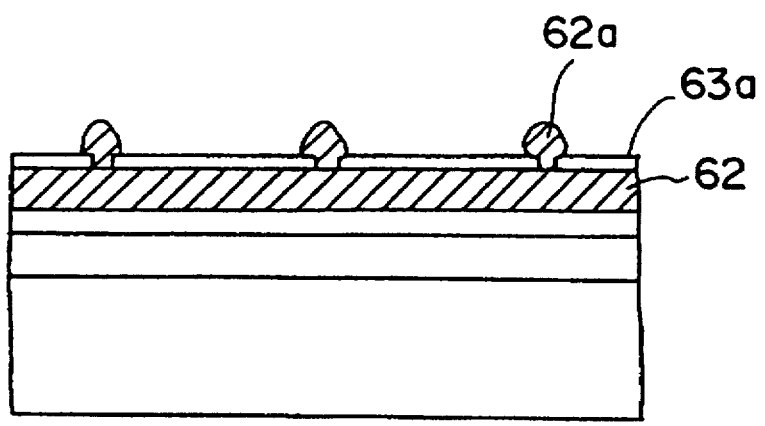

FIGS. 16A, 16B and 16C are sectional views showing a method for manufacturing a magnetic recording medium according to the tenth embodiment of the present invention. In the tenth embodiment, the method for forming the rough surface recited in FIGS. 14A, 14B and 14C has been applied to the protection layer on the recording layer 55. In FIGS. 16A, 16B and 16C, identical symbols to those in FIGS. 13A, 13B, 13C and 13D indicate identical parts in FIGS. 13A, 13B, 13C and 13D.

First, a base layer 54 of a chromium (Cr) film having a film thickness of about 40 nm, and a recording layer 55 of a CoCrPt film having a film thickness of about 20 nm are formed in order on a well cleaned and sufficiently smooth surface of a silicon substrate 51, as shown in FIG. 16A.

Subsequently, by the same method and conditions as those used in the ninth embodiment, a chromium (Cr) film 62 having a film thickness of about 20 nm and a silicon oxide film 63 including the carbon 63b and having a film thickness of about 5 nm are formed in sequence.

Next, the plasma generation power of 600 W may be applied to effect plasma process for ten minutes at the oxygen Gas pressure of 10 mTorr. Thus, as shown in FIG. 16B, the carbon 63b is removed to expose the Cr film 62 there. If plasma process is continued further, projections 62a having a diameter of 100 nm and a height of 50 nm are formed by reaction between oxygen and Cr, as shown in FIG. 16C. With the above, the magnetic recording medium has been obtained.

As discussed earlier, according to the tenth embodiment, since the protection layer on the recording layer 55 is formed to have the rough surface, the rough surface of the recording layer 55 per se may be avoided, so that roughness of the surface of the recording layer 55 can be prevented to thus suppress medium noises.

(Eleventh Embodiment)

Figure 19:
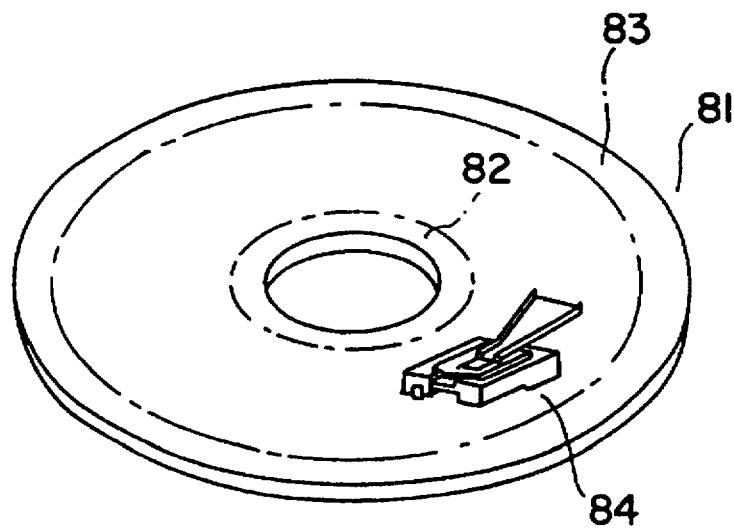
FIG. 19 is a perspective view showing a configuration of a magnetic disk and a magnetic recording drive according to an eleventh embodiment of the present invention.

FIG. 19 is a perspective view showing a configuration of a magnetic disk and a magnetic recording drive according to an eleventh embodiment of the present invention.

Usually, although the texture process has been applied to the entire surface of the magnetic disk, a feature of the eleventh embodiment is that such texture process may be applied to the inner circumferential portion 82 and the outer circumferential portion 83 of the circular magnetic disk 81, as shown in FIG. 19. Now FIG. 19 shows the magnetic recording drive in CSS scheme wherein the magnetic head 84 is forced so as to contact to the surface of the magnetic disk 81 at the time of stop and it is floating with slight clearance against the magnetic disk 81 during the operation.

If the above magnetic disk 81 is applied to the magnetic recording drive in CSS scheme, especially it serves effectively at the time of operation start and stop wherein sticking between the magnetic head 84 and the magnetic disk 81. Thus, since the texture process can be applied to only required portions, it becomes possible further to reduce a floating magnitude of the magnetic head.

In the case of partial texture processing as above, a laser light is available effectively as a heating means. The projections may be formed partially on the inner periphery or the outer periphery if partial heating is done to the inner periphery or the outer periphery by means of laser irradiation in the oxygen gas.

According to the eighth to eleventh embodiments, reactive material regions are partially distributed at a predetermined density on the entirety of the surface region of a nonreactive material of a layer, then the surface region of the layer is exposed to a reaction gas to cause the reactive material to react to the reaction gas, thus raising partially the surface of the layer.

If the second film of the nonreactive material is formed on the first film to have a film thickness which does not to form continuous films in a plane direction, density of the projection and diameter and height of the projection formed on the discontinued areas may be controlled appropriately by adjusting the film thickness. In addition, if the nonreactive material consists of a silicon oxide film added with reactive material, density of the projection and size of the projection may also be controlled appropriately since density and size of the second reactive material collected portions may be adjusted by varying the second reactive material contained amount.

As stated before, according to the method for forming the rough surface of the present invention, the surface of the substrate may be readily rendered rough so as to achieve the appropriate rough surface. This method for forming the rough surface makes it possible to form the magnetic recording medium which is subjected to the texture processing.

According to other magnetic recording medium of the present invention, since the method for forming the rough surface may be applied to the protection layer formed on the recording layer, the rough surface of the recording layer will not be caused. As a result, a coarse surface of the recording layer can be prevented to thus suppress medium noises generated in the magnetic recording medium.

Furthermore, if the magnetic disk is employed in the magnetic recording drive using a CSS scheme, it can operate only at the time of operation start and stop where the sticking is considered seriously since an inner circumferential portion and an outer circumferential portion of the magnetic disk are treated by the method for forming the rough surface of the layer. Thereby, since the texture processing may be applied to only necessary portions, it is feasible to reduce the medium noises due to the rough surface of the recording layer.

What is claimed is:

1. A method for manufacturing a magnetic recording medium comprising the steps of:

forming a recording film of a magnetic material on a nonmagnetic substrate;

forming a protection film containing at least a first and a second nonmagnetic materials on said recording film; and selectively etching one of said first material and said second material of said protection film to transform a surface of said protection film into a rough surface.

2. A method according to claim 1, wherein said protection film is formed of a multilayered film consisting of a first film of said first nonmagnetic material and a second film of said second nonmagnetic material.

3. A method according to claim 2, wherein said multilayered protection film is formed by alternatively depositing said first film and said second film.

4. A method according to claim 2, wherein said first film and said second film have respectively a discontinuous part which a part of an underlayer is exposed.

5. A method according to claim 4, wherein respective thicknesses of said first film and said second film are 5 Å to 50 Å.

6. A method according to claim 1, wherein said protection film is formed of a composite film consisting of a mixed material of said first and said second nonmagnetic materials.

7. A method according to claim 6, wherein said composite protection film is formed by simultaneously depositing said first material and said second material.

8. A method according to claim 1, wherein said first nonmagnetic material is carbon, and said second nonmagnetic material is one selected from a group of Al, Cr, Zr, Hf, Ti, Si, Mg, their oxide, nitride and carbide.

9. A method according to claim 1, wherein said etching step is conducted in an atmosphere of oxygen gas by one of heating process, UV irradiation process and plasma process.

10. A method according to claim 1, wherein said etching step is conducted by a plasma etching in an atmosphere containing one of a fluorine and chlorine.

11. A method for manufacturing a magnetic recording medium comprising the steps of:

forming a recording film of a magnetic material on a nonmagnetic substrate;

forming a protection film consisting of one selected from a group of nonmagnetic amorphous material and nonmagnetic microcrystalline material on said recording film; and annealing said protection film to crystallize said amorphous material or to enlarge a crystal size of said microcrystal material thereby forming a protection film having a rough surface.

12. A method according to claim 11, wherein said annealing is conducted in an atmosphere excluding an oxygen gas.

13. A method according to claim 11, wherein a material of said protection film includes at least one selected from a group of $Al_xSn_{100-x}$ ($1 \leq x \leq 10\%$), $Ag_yBi_{100-y}$ ($1 \leq y \leq 35\%$), $Al_aGe_{100-a}$ ($10 \leq a \leq 40\%$), $Al_bLa_{100-b}$ ($82 \leq b \leq 92\%$), $Al_cSi_{100-c}$ ($2 \leq c \leq 15\%$), $Al_dTe_{100-d}$ ($78 \leq d \leq 99\%$), $Au_eGe_{100-e}$ ($20 \leq e \leq 44\%$), $Au_fSb_{100-f}$ ($28 \leq f \leq 67\%$), $Au_gSi_{100-g}$ ($67 \leq g \leq 85\%$), $Pt_nSb_{100-h}$ ($66 \leq h \leq 68\%$), $Ag_iCe_{100-i}$ ($20 \leq i \leq 25\%$), $Ag_jGe_{100-j}$ ($72 \leq j \leq 76\%$), $Ag_kLa_{100-k}$ ($23 \leq k \leq 32\%$), $Ag_mSb_{100-m}$ ($11 \leq m \leq 78\%$) (where % is indicated by atomic %).

14. A method for transforming a surface of a layer into a rough surface, comprising the steps of:

forming the layer on a substrate, said layer being formed of a first material and a second material in a way that portions of the first material are partially exposed from the surface of the layer; and applying a first reaction gas on said surface of said layer so as to cause a reaction with the exposed portions of the first material thereby forming bumps on the surface of the layer.

15. A method according to claim 14, wherein said layer forming step is further comprising steps of:

depositing the first material to form a first layer;

depositing the second material, which does not react with the first reaction gas, on the first layer to form a second layer.

16. A method according to claim 14, wherein said first material is chromium.

17. A method according to claim 14, wherein said second material is one of oxides of silicon.

18. A method according to claim 14, wherein said first reaction gas is either one of oxygen gas and nitrogen gas.

19. A method according to claim 14, wherein said first reaction gas applying step is conducted by heating the second material in an atmosphere containing either one of oxygen gas and nitrogen gas as the first reaction gas.

20. A method according to claim 14, wherein said layer forming step includes steps of:

forming a first film of a first material which is reactive with said first reaction gas;

forming on said first film a second film including the second material which is non-reactive with said first reaction gas and a third material; and selectively removing said third material from said second film using a second reaction gas so as to partially expose said first film through said second film.

21. A method according to claim 20, wherein said first material is chromium.

22. A method according to claim 20, wherein said third material is carbon, and said second material is a silicon oxide film.

23. A method according to claim 20, wherein said removing step is conducted by vaporizing said third material using a plasmanized gas containing an oxygen gas.

24. A method according to claim 20, wherein said removing step is conducted by vaporizing said third material by heating it in an atmosphere containing an oxygen gas.

25. A method according to any one of claims 19 and 24, wherein said heating is conducted by laser irradiation.

* * * * *

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 1, line 21, after "with" insert --by--

Column 1, line 27, after "adjust" insert --the--

Column 1, line 29, delete "in proportion" and insert --proportionally-- therefor Column 1, line 30, delete "higher" and insert --high-- therefor Column 1, line 35, after "by" insert --mechanically-- and after "forming" delete "mechanically" therefor

UNITED STATES PATENT AND TRADEMARK OFFICE
CERTIFICATE OF CORRECTION

PATENT NO. : 5,645,898  Page 2 of 44
DATED : July 8, 1997
INVENTOR(S) : Sato et al.

It is certified that error appears in the above-identified patent and that said Letters Patent is hereby corrected as shown below:

Column 1, line 38, after "substrate"

insert --(-- (parenthesis)

Column 1, line 39, delete "formed"

and insert --form)-- therefor

Column 1, line 47, delete "so that"

Column 1, line 65, delete "a" and insert --the-- therefor

Column 1, line 67, delete "the contact to" and insert --contact with-- therefor

Column 2, line 1, delete "dusts" and insert --dust-- line 2, after "head" insert --to-- therefor

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 2, line 2, delete "crush" and insert --crash-- therefor

Column 2, line 5, after "in" insert --the--

Column 2, line 10, delete "Such coarse" and insert --In general, such a coarse-- therefor Column 2, line 10, delete "in general"

Column 2, line 11, after "this," insert --in--

Column 2, line 25, delete "let" and insert --make-- therefor

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 2, line 44, delete "one" and delete "the"

Column 2, line 45, delete "of one"

Column 2, line 48, after "either" insert --type of--

Column 2, lines 50-51, delete "since only" and line 51 after "either" insert --type of-- therefor Column 2, line 60, after "maintains" insert --a--

Column 2, line 63, after "as" insert --a--

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 2, line 64, before "UV" insert --a--, and before "plasma" insert --a--

Column 3, line 1, before "plasma" insert --a--

Column 3, line 14, before "inert" insert --an--

Column 3, line 26, delete "raising partially" and insert --partially raising-- therefor Column 3, line 30, delete "first is" and insert --is first-- therefor Column 3, line 31, delete "to form" and insert --form a-- therefor

UNITED STATES PATENT AND TRADEMARK OFFICE
CERTIFICATE OF CORRECTION

PATENT NO. : 5,645,898  Page 6 of 44
DATED : July 8, 1997
INVENTOR(S) : Sato et al.

It is certified that error appears in the above-identified patent and that said Letters Patent is hereby corrected as shown below:

Column 3, line 35, delete "to"

and insert --with-- therefor

Column 3, line 37, after "by" insert

--partially--

Column 3, line 37, delete "partially"

Column 3, line 40, delete "to"

and insert --with-- therefor

Column 3, line 50, delete "to"

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 3, line 51, before "density" insert --the--

Column 3, line 51, before "height" insert --the--

Column 3, line 55, before "density" insert --the--

Column 3, line 55, before "diameter" insert --the--, and before "height" insert --the--

Column 3, line 56, before "density" insert --the--, line 57 before "size" insert --the--

Column 3, line 58, delete "contained amount" and insert --amount contained-- therefor

UNITED STATES PATENT AND TRADEMARK OFFICE
CERTIFICATE OF CORRECTION

PATENT NO. : 5,645,898

DATED : July 8, 1997

INVENTOR(S) : Sato et al.

It is certified that error appears in the above-identified patent and that said Letters Patent is hereby corrected as shown below:

Column 3, line 65, delete "other" and insert --another-- therefor

Column 4, line 3, delete "to" and insert --from being-- therefor

Column 4, line 3, after "thus" insert --any--

Column 4, line 8, after "considered" delete "seriously" and insert --to be serious-- therefor Column 4, line 12, delete "to only" and insert --only to the--, therefor Column 4, line 16, delete "effectively as a" and insert --as an effective-- therefor

UNITED STATES PATENT AND TRADEMARK OFFICE
CERTIFICATE OF CORRECTION

PATENT NO. : 5,645,898

DATED : July 8, 1997

INVENTOR(S) : Sato et al.

It is certified that error appears in the above-identified patent and that said Letters Patent is hereby corrected as shown below:

Column 4, line 34, delete "being" and insert --has been-- therefor

Column 4, line 40 delete "being" and insert --has been-- therefor

Column 4, line 44, delete "being" and insert --has been-- therefor

Column 4, line 49, delete "being" and insert --has been-- therefor

Column 4, line 52, delete "being" and insert --has been-- therefor

Column 4, line 56, delete "being" and insert --has been-- therefor

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 4, line 59, delete "being" and insert --has been-- therefor

Column 4, line 63, delete "being" and insert --has been-- therefor

Column 4, line 65, delete "being" and insert --has been-- therefor

Column 4, line 67, after "between" insert --the--, and after "of" insert --a--, and after "and" insert --the--

Column 5, line 5, after "between" insert --the--, and after "of" insert --a-- and after "and" insert --the--

UNITED STATES PATENT AND TRADEMARK OFFICE
CERTIFICATE OF CORRECTION

PATENT NO. : 5,645,898

DATED : July 8, 1997

INVENTOR(S) : Sato et al.

It is certified that error appears in the above-identified patent and that said Letters Patent is hereby corrected as shown below:

Column 5, line 11, after "between" insert --the--

Column 5, line 11, before "raised" insert --the--, line 12 before "surface" insert --a--

Column 5, line 53, delete "First Embodiment)" and insert --(First Embodiment)-- therefor Column 5, line 57, delete "being" and insert --has been-- therefor Column 5, line 61, delete "being" and insert --has been-- therefor Column 5, line 65, before "2," insert --reference--, and after "2," insert --a--

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 5, line 65, before "3," insert --reference-- and after "3," insert --a--

Column 6, line 5, delete "correspond" and insert --corresponds-- therefor

Column 6, line 6, after "FIG. 3A" insert --,-- (a comma)

Column 6, line 11, delete "other" and insert --another-- therefor

Column 6, line 18, delete "an"

Column 6, line 32, delete "an"

UNITED STATES PATENT AND TRADEMARK OFFICE
CERTIFICATE OF CORRECTION

| | | |
|---|---|---|
| PATENT NO. : | 5,645,898 | Page 13 of 44 |
| DATED : | July 8, 1997 | |
| INVENTOR(S) : | Sato et al. | |

It is certified that error appears in the above-identified patent and that said Letters Patent is hereby corrected as shown below:

Column 6, line 41, after "by" insert --an-- and after "or" insert --a--

Column 6, line 42, delete "oxygen containing" and after "atmosphere" insert --containing oxygen-- therefor Column 6, line 54, after "by" insert --an--

Column 6, line 58, after "by" insert --an--

Column 6, line 65, delete "the" (1st occur.)

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 7, line 3, delete "detail" and insert --detailed-- therefor

Column 7, line 7, before "atom" insert --an--

Column 7, line 22, before "oxygen" insert --an-- and after "or" insert --a--

Column 7, line 49, after "etching" insert --(-- and after "as" insert --with a--

Column 7, line 49, delete "a" and insert --an-- therefor

Column 7, line 51 after "etc.)" insert --)-- (a parenthesis)

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 7, line 54, delete "being" and insert --has been-- therefor

Column 7, line 56, delete "being" and insert --has been-- therefor

Column 7, line 59, delete "detail" and insert --detailed-- therefor

Column 8, line 2, before "$CF_4$," insert --a--.

Column 8, line 19, delete "Sputtering" and insert --A sputtering-- therefor

Column 8, line 25, before "$CF_4$" insert --a--

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 8, line 28, delete "a plenty of" and insert --plenty of the-- and delete "radical" and insert --radicals-- therefor Column 8, line 32, before "combination" insert --a--

Column 8, line 37, before "combination" insert --a--

Column 8, line 37, before "plasma" insert --the--

Column 9, line 4, before "CCl$_4$" insert --a--

Column 9, line 5, delete "radical" and insert --radicals-- therefor

UNITED STATES PATENT AND TRADEMARK OFFICE
CERTIFICATE OF CORRECTION

| | | |
|---|---|---|
| PATENT NO. : | 5,645,898 | Page 17 of 44 |
| DATED : | July 8, 1997 | |
| INVENTOR(S) : | Sato et al. | |

It is certified that error appears in the above-identified patent and that said Letters Patent is hereby corrected as shown below:

Column 9, line 9, delete "being" and insert --has been-- therefor

Column 9, line 10, delete "being" and insert --has been-- therefor

Column 9, line 12, before "clear" insert --a--

Column 9, line 21, before "combination" insert --a--

Column 9, line 22, before "plasma" insert --the--

Column 9, line 37, delete "Especially,"

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 9, line 39, delete "being" and insert --has been-- therefor

Column 9, line 41, delete "being" and insert --has been-- therefor

Column 9, line 45, before "vacuum" insert --a-- and delete "at" and insert --in an-- therefor Column 9, line 55, before "sputtering" insert --a--

Column 9, line 57, before "has" insert --still--

Column 9, line 58, delete "yet"

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 9, line 59, before "vacuum" insert --a--

Column 9, line 63, before "process" insert --this-- and delete "Inert" and insert --An inert-- therefor Column 9, line 66, delete "the enoughly rough" and insert --a rough enough-- therefor Column 10, line 1, delete "the"

Column 10, line 4, delete "the"

Column 10, line 11, delete "rough sufficiently" and insert --sufficiently rough-- therefor

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 10, line 12, before "not" insert --so as--

Column 10, line 18, before "Bi" insert --a-- and delete "65 at %" and insert --65%-- therefor Column 10, line 23, before "kinetic" insert --the--

Column 10, line 25, delete "the" and insert --an-- therefor

Column 10, line 34, delete "the" (first occurrence) and insert --an-- therefor

Column 10, line 42, before "raised" insert --the--

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 10, line 43, before "kinetic" insert --the--

Column 10, line 45, before "kinetic" insert --the--

Column 10, line 48, before "kinetic" insert --the--

Column 10, line 52, delete "being" and insert --has been-- therefor

Column 10, line 58, before "raised" insert --the--

Column 10, line 59, before "guaranteed" insert --the--

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 10, line 65, before "guaranteed" insert --the--

Column 11, line 1, before "guaranteed" insert --the--

Column 11, line 5, before "raised" insert --the--

Column 11, line 9, before "raised" insert --a--

Column 11, line 10, before "low" (first occurrence) insert --a-- and before low (second occurrence) insert --a--

Column 11, line 12, delete "requirement" and insert --requirements--therefor

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 11, line 15, before "lower" insert --a--

Column 11, line 18, before "Si" insert --a-- and delete "90 at %" and insert --90%-- therefor Column 11, line 20, before "surface" insert --the-- and after "in" insert --the--

Column 11, line 21, before "raised" insert --the-- line 22 before "kinetic" insert --the--

Column 11, line 22, before "AlSn" insert --an--

Column 11, line 29, before "fine" insert --a--

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 11, line 30, before "sputtering" insert --a--

Column 11, line 34, delete "alloy" and insert --alloys-- therefor

Column 11, line 34, after "listed" delete "." (the period) and insert --:-- (a colon) therefor Column 11, line 34, delete "That is, there are"

Column 11, line 37, delete "by at" and insert --as-- therefor

Column 11, line 51, after "of" insert --the--

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 11, line 52, before "relatively" insert --a--

Column 11, line 54, delete "Widely" and insert --The widely-- therefor

Column 11, line 58, delete "followings" and insert --following-- therefor

Column 12, line 1, delete "being" and insert --is-- therefor

Column 12, line 8, before "surface" insert --a--

Column 12, line 23, before "DC" insert --a--

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 12, line 24, before "Ar"

insert --the--

Column 12, line 24, before "power"

insert --the--

Column 12, line 28, before "RF"

insert --an--

Column 12, line 29, before "Ar"

insert --the--

Column 12, line 29, before "power"

insert --the--

Column 12, line 31, before "not"

insert --so as-- and after "form" insert --a--

UNITED STATES PATENT AND TRADEMARK OFFICE
CERTIFICATE OF CORRECTION

PATENT NO. : 5,645,898

DATED : July 8, 1997

INVENTOR(S) : Sato et al.

It is certified that error appears in the above-identified patent and that said Letters Patent is hereby corrected as shown below:

Column 12, line 33, before "opposing" insert --the--

Column 12, line 35, delete "in" and insert --into-- therefor

Column 12, line 38, before "oxygen" insert --the--

Column 12, line 39, before --plasma-- insert --a--

Column 12, line 54, before "sputtering" insert --a--

Column 12, line 59, delete "not to" and insert --that does not-- therefor

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 12, line 62, delete "to" and insert --with-- therefor

Column 12, line 63, delete "is" and insert --are-- therefor

Column 13, line 2, before "appropriate" insert --the--

Column 13, line 4, before "projection" (first and second occurrences) insert --the--

Column 13, line 4, before "projection" insert --the-- (3rd occur.)

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 13, line 16, before

"projection" (both occur.) insert --the--

Column 13, line 17, before

"projection" insert --the--

Column 13, line 19, before

"projection" insert --the-- column 13, line 20, insert --an--

Column 13, line 21, before

"projection" (both occur.) insert --the--

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 13, line 25, before "process" insert

--the--

Column 13, line 26, before "application" insert --the--

Column 13, line 29, before "heat" insert --a--

Column 13, line 31, before "projection" ( both occur.) insert --the--

Column 13, line 31-32, before "projection" insert --the--

Column 13, line 32, delete "level" and insert --levels-- therefor

UNITED STATES PATENT AND TRADEMARK OFFICE
CERTIFICATE OF CORRECTION

PATENT NO. : 5,645,898

DATED : July 8, 1997

INVENTOR(S) : Sato et al.

It is certified that error appears in the above-identified patent and that said Letters Patent is hereby corrected as shown below:

Column 13, line 34, before "process" insert --adjusting the--

Column 13, line 35, delete "more" and before "process" insert --the-- therefor

Column 13, line 36, before "heating" insert --the-- and delete "more" therefor

Column 13, line 37, before "ten" insert --a--

Column 13, line 41, before "process" insert --a--

Column 13, line 43, after "film" insert --,-- (a comma)

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 13, line 65, after "by" insert

--a--

Column 13, line 67, before "Ar"

insert --the-- line 68, before "power" insert --the--

Column 14, line 1, before "insulating"

delete "a" and insert --an-- therefor

Column 14, line 4, before "RF" insert

--an--

Column 14, line 5, before "Ar" insert

--the-- line 6, before "power" insert --the--

Column 14, line 9, delete "a"

and insert --an-- therefor

UNITED STATES PATENT AND TRADEMARK OFFICE
CERTIFICATE OF CORRECTION

PATENT NO. : 5,645,898

DATED : July 8, 1997

INVENTOR(S) : Sato et al.

It is certified that error appears in the above-identified patent and that said Letters Patent is hereby corrected as shown below:

Column 14, line 9 before "carbon" insert --amount of-- and delete "containing amount" and insert --contained-- therefor Column 14, line 10 & 11, before each occur. of "exposure" insert --the--

Column 14, line 12, delete "carbon containing amount" and insert --amount of carbon contained-- therefor Column 14, line 13, before "exposure" insert --the--

Column 14, line 14, before "exposure" insert --the--

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 14, line 16, before "carbon" insert --the--

Column 14, line 17, before "desired" insert --a--

Column 14, line 18, after "mTorr," insert --a--

Column 14, line 19, before "plasma" insert --a--

Column 14, line 23, delete "to be" (second occurrence) and insert --and-- therefor Column 14, line 25, delete "to" and insert --with-- therefor

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 14, line 36, delete "C's are" and insert --C is-- therefor

Column 14, line 39, delete "C's are removed partially" and insert --C is partially removed-- therefor Column 14, line 45, delete "is" and insert --are-- therefor Column 14, line 48, after "carbon" insert --, the--

Column 14, line 55, before "carbon" insert --the-- and delete "ration" and insert --ratio-- therefor

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 14, line 56, before

"projection" insert --the--

Column 14, line 57, before

"projection" insert --the--

Column 14, line 62, delete "ration,"

and insert --ratio, the-- therefor

Column 14, line 62, before

"projection" insert --the--

Column 14, line 64, before

"projection" insert --the--

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 14, line 67, before "projection" insert --the--

Column 15, line 2, delete "ration," and insert --ratio, the-- therefor

Column 15, line 4, before "projection" insert --the--

Column 15, line 6, before "projection" insert --the--

Column 15, line 7, after "by" insert --adjusting the--

Column 15, line 8, before "application" insert --the--

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 15, line 9, before "process" insert --the--

Column 15, line 10, before "application" insert --the--

Column 15, line 11, before "process" insert --the--

Column 15, line 13, before "process" insert --the--

Column 15, line 14, before "being" insert --is--

Column 15, line 14, delete "be" line 15, after "readily" insert --be-- therefor

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 15, line 17, before "texture"

insert --a--

Column 15, line 19, before "heating"

insert --the--

Column 15, line 21, before "projection" (first and second occurrence) insert --the--

Column 15, line 21, before "projection" (3rd occur.) insert --the--

Column 15, line 23, before "plasma"

insert --the--

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 15, line 23, before "heating"

insert --the--

Column 15, line 25, before "process"

insert --a--

Column 15, line 26, before "Cr"

insert --a--

Column 15, line 59, delete "Gas pressure" and insert --gas pressure-- therefor

Column 15, line 61, before "plasma"

insert --the--

Column 16, line 11, before "texture"

insert --that the--

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 16, line 15, before "CSS"

insert --a--

Column 16, line 16, delete "to"

Column 16, line 17, delete "at the time of" and insert --when stopped-- therefor Column 16, line 17, delete "stop"

Column 16, line 20, before "CSS"

insert --a-- and delete "especially it" and insert --it especially-- therefor

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 16, line 23, after "81" insert

--generously occurs-- .

Column 16, line 27, delete

"effectively as a" and insert --as an effective--, therefor

Column 16, line 37, delete "raising partially" and insert --partially raising-- therefor Column 16, line 41, before "density"

insert --the-- Column 16, line 42, before "diameter" insert --the-- and before "height" insert --the--

Column 16, line 45, before "reactive"

insert --a-- Column 16, line 46, before "density" insert --the--

UNITED STATES PATENT AND TRADEMARK OFFICE
CERTIFICATE OF CORRECTION

PATENT NO. : 5,645,898
DATED : July 8, 1997
INVENTOR(S) : Sato et al.

It is certified that error appears in the above-identified patent and that said Letters Patent is hereby corrected as shown below:

Column 16, line 46, before "size"

insert --the--

Column 17, line 1, delete "seriously"

and insert --to be serious-- therefor

Column 17, line 5, delete "to only"

and insert --only to the-- therefor

In the Claims:

Column 17, line 14, delete

"materials" and insert --material-- therefor

Column 17, line 44, before "heating"

insert --a-- and before "UV" insert --a--

UNITED STATES PATENT AND TRADEMARK OFFICE
CERTIFICATE OF CORRECTION

PATENT NO. : 5,645,898

DATED : July 8, 1997

INVENTOR(S) : Sato et al.

It is certified that error appears in the above-identified patent and that said Letters Patent is hereby corrected as shown below:

Column 17, line 44, before "plasma"

insert --a--

Signed and Sealed this

Twenty-ninth Day of December, 1998

Attest:

BRUCE LEHMAN

Attesting Officer

Commissioner of Patents and Trademarks